US011934867B2

(12) United States Patent
Damani et al.

(10) Patent No.: US 11,934,867 B2
(45) Date of Patent: Mar. 19, 2024

(54) TECHNIQUES FOR DIVERGENT THREAD GROUP EXECUTION SCHEDULING

(71) Applicant: NVIDIA Corp., Santa Clara, CA (US)

(72) Inventors: Sana Damani, Atlanta, GA (US); Mark Stephenson, Austin, TX (US); Ram Rangan, Chennai (IN); Daniel Robert Johnson, Austin, TX (US); Rishkul Kulkarni, Austin, TX (US)

(73) Assignee: NVIDIA CORP., Santa Clara, CA (US)

( * ) Notice: Subject to any disclaimer, the term of this patent is extended or adjusted under 35 U.S.C. 154(b) by 378 days.

(21) Appl. No.: 17/184,420

(22) Filed: Feb. 24, 2021

(65) Prior Publication Data

US 2022/0027194 A1 Jan. 27, 2022

Related U.S. Application Data

(60) Provisional application No. 63/056,440, filed on Jul. 24, 2020, provisional application No. 63/055,802, filed on Jul. 23, 2020.

(51) Int. Cl.
| | |
|---|---|
| *G06F 9/46* | (2006.01) |
| *G06F 9/30* | (2018.01) |
| *G06F 9/48* | (2006.01) |
| *G06F 9/52* | (2006.01) |

(52) U.S. Cl.
CPC .......... *G06F 9/4881* (2013.01); *G06F 9/3009* (2013.01); *G06F 9/522* (2013.01)

(58) Field of Classification Search
CPC ....... G06F 9/4881; G06F 9/3009; G06F 9/522
See application file for complete search history.

(56) References Cited

U.S. PATENT DOCUMENTS

| | | |
|---|---|---|
| 6,061,710 A | 5/2000 | Eickemeyer et al. |
| 7,673,122 B1 | 3/2010 | Song et al. |
| 9,424,099 B2 | 8/2016 | Houston et al. |
| 9,612,836 B2 | 4/2017 | Ohannessian et al. |
| 9,898,287 B2 | 2/2018 | Puthoor et al. |
| 10,402,937 B2 | 9/2019 | Dimitrov et al. |
| 10,409,571 B1 | 9/2019 | Targowski |
| 10,430,915 B2 | 10/2019 | Khodakovsky et al. |
| 10,581,645 B1 | 3/2020 | Song et al. |
| 10,599,404 B1 | 3/2020 | Neto et al. |
| 10,699,427 B2 | 6/2020 | Uralsky et al. |
| 11,768,715 B1 | 9/2023 | Eltantawy et al. |
| 2007/0074213 A1 | 3/2007 | Ma et al. |
| 2007/0143755 A1 | 6/2007 | Sahu et al. |

(Continued)

OTHER PUBLICATIONS

U.S. Appl. No. 63/056,440, filed Jul. 24, 2020, Sana Damani.

(Continued)

*Primary Examiner* — Tammy E Lee
(74) *Attorney, Agent, or Firm* — Rowan TELS LLC

(57) ABSTRACT

Warp sharding techniques to switch execution between divergent shards on instructions that trigger a long stall, thereby interleaving execution between diverged threads within a warp instead of across warps. The technique may be applied to mitigate pipeline stalls in applications with low warp occupancy and high divergence. Warp data cache locality may also be improved by concentrating memory accesses within a warp rather than spreading them across warps.

24 Claims, 18 Drawing Sheets

(56) References Cited

U.S. PATENT DOCUMENTS

| | | | |
|---|---|---|---|
| 2007/0180438 A1* | 8/2007 | Suba | G06F 8/4441 |
| | | | 717/151 |
| 2011/0219221 A1 | 9/2011 | Skadron et al. | |
| 2012/0096474 A1 | 4/2012 | Jiao | |
| 2013/0117541 A1 | 5/2013 | Choquette et al. | |
| 2013/0166881 A1 | 6/2013 | Choquette et al. | |
| 2014/0164737 A1 | 6/2014 | Collange et al. | |
| 2014/0165049 A1 | 6/2014 | Diamos et al. | |
| 2014/0340403 A1* | 11/2014 | Droske | G06T 15/06 |
| | | | 345/426 |
| 2014/0365752 A1 | 12/2014 | Howes et al. | |
| 2015/0026438 A1 | 1/2015 | Giroux et al. | |
| 2016/0019066 A1* | 1/2016 | Diamos | G06F 9/3009 |
| | | | 712/228 |
| 2017/0315806 A1 | 11/2017 | Mazumdar | |
| 2019/0088009 A1* | 3/2019 | Forey | G06T 15/005 |
| 2019/0213775 A1 | 7/2019 | Dimitrov et al. | |
| 2019/0243654 A1* | 8/2019 | Mirhosseininiri | G06F 9/3877 |
| 2019/0304049 A1* | 10/2019 | Ray | G06F 9/4831 |
| 2020/0043228 A1 | 2/2020 | Patrick et al. | |
| 2020/0081748 A1 | 3/2020 | Johnson et al. | |
| 2020/0143590 A1 | 5/2020 | Gruen | |
| 2020/0175392 A1 | 6/2020 | Tang et al. | |
| 2020/0210276 A1 | 7/2020 | Sullivan et al. | |
| 2021/0141643 A1 | 5/2021 | Horsnell et al. | |

OTHER PUBLICATIONS

Brunie et al., "Simultaneous Branch and Warp Interweaving for Sustained GPU Performance", published by IEEE, pp. 49-60 ( Year: 2012).

Diamos et al., "SIMD Re-Convergence at Thread Frontiers", published by ACM, MICRO'11, Dec. 3-7, 2011, Porto Alegre, Brazil, pp. 1-12 (Year: 2011).

Reducing Branch Divergence in GPU Programs HAN.

Reducing Divergence in GPGPU Programs with Loop Merging HAN.

Volta: Performance and Programmability Choquette.

Choquette et al, Volta: Performance and Programmability, IEEE Computer Society Mar./Apr. 2018 p. 42-52.

Han et al, Reducing Branch Divergence in GPU Programs, ACM 978-1-4503-0569-3/11/03, p. 1-8.

Han et al, Reducing Divergence in GPGPU Programs with Loop Merging, ACM 978-1-4503-2017-07/11/03, p. 1-12.

NPL, Lee et al., "Convergence and Scalarization for Data-Parallel Architectures", published by IEEE, CGO'13 Feb. 23-27, 2013, Shenzhen, China, pp. 1-11 (Year: 2013).

NPL_CUDA Binary Utilities Version 12.2, https://docs.nvidia.com/cuda/cuda-binary-utilities/index.html#notices, Nvidia Corporation, Oct. 2023.

Word Reference.com Language Forums, "some: at least one?", Jan. 2014, 3 pages, Retrieved from the Internet< URL: https://forum.wordreference.com/threads/some-at-least-one.2768883/ >.

* cited by examiner

```
1.      BSSY B0, syncPoint
2. @P0  BRA  Else  // P0 is 1 for t0, 0 for t1
3.      TLD R2, R0, R1; &wr=sb5
4.      FMUL R10, R5, c[1][16];
5.      FMUL R2, R2, R10; &req=sb5 // load-to-use stall
6.      BRA syncPoint;
Else:
7.      TEX R1, R8, R9; &wr=sb2
8.      FADD R1, R1, R3; &req=sb2 // load-to-use stall
9.      BRA syncPoint;
syncPoint:
10.     BSYNC B0;
```

TECHNIQUES FOR DIVERGENT THREAD GROUP EXECUTION SCHEDULING

CROSS REFERENCE TO RELATED APPLICATIONS

This application claims priority and benefit under 35 U.S.C. 119(e) to application serial number U.S. 63/055,802, "WARP SHARD SWITCHING BEFORE LONG-LATENCY OPERAND COMPLETION", filed on Jul. 23, 2020, the contents of which are incorporated herein by reference in their entirety. This application also claims priority and benefit under 35 U.S.C. 119(e) to application serial number U.S. 63/056,440, "WARP SHARD SWITCHING BEFORE LONG-LATENCY OPERAND COMPLETION", filed on Jul. 24, 2020, the contents of which are incorporated herein by reference in their entirety.

BACKGROUND

Some types of processors such as graphics processing units (GPUs) execute groups of threads called warps in a Single Instruction Multiple Thread (SIMT) manner, in which multiple threads in a warp execute the same instruction in parallel. A warp is a set of threads grouped to undergo execution together on a processor. For example a warp may comprise thirty-two threads of a ray tracing application, each thread tracing out a single ray.

When individual threads take divergent execution paths, parallel execution is no longer possible, and the divergent paths are serialized, temporarily, for execution. This is referred to as thread divergence, the condition in which the next instruction to execute in a first thread is at a different program counter location than the next instruction to execute in a second thread.

When thread divergence occurs, the processor may select one path to execute while idling threads take the other path or paths. When (or if) the executing thread(s) stalls, the idle threads remain idle, and warp execution resources become under-utilized. Conventionally, GPUs executing SIMT warps may react to stalls on threads by switching execution between entire warps. The presence of stalled threads may thus decrease warp occupancy, resulting in inefficient utilization of computing resources, where warp occupancy refers to the ratio of a number of actively executing warps to a total number of active warps that a streaming mulitprocessor is configured to support.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
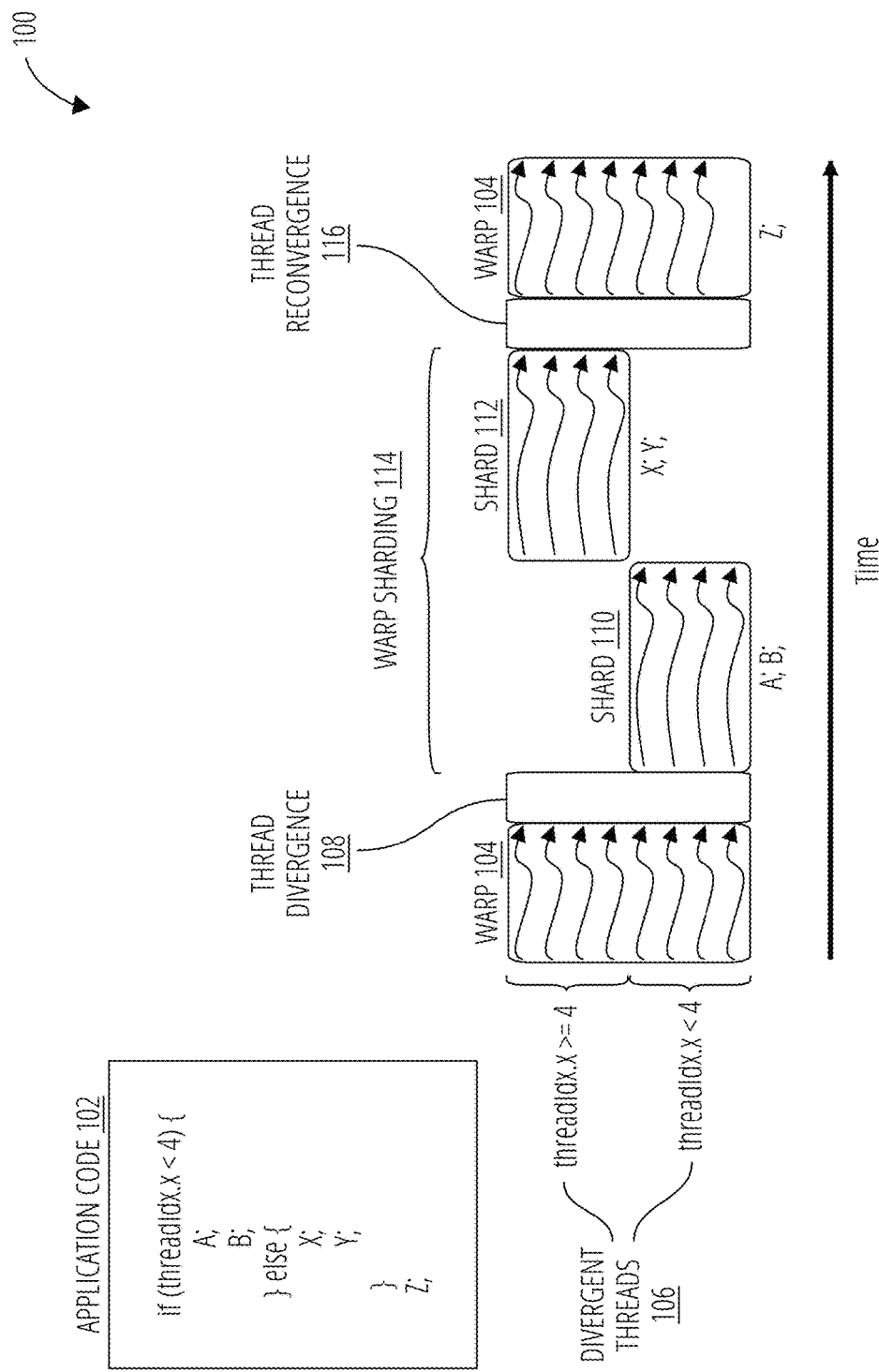
FIG. 1 depicts shard divergence 100 in accordance with one embodiment.

"Warp sharding" refers to executing a warp of threads in a plurality of groups of parallel executing threads, called shards. A shard is a subset of one or more threads in a warp that are fully converged, e.g., that have not diverged and thus all execute the same instruction program counter in parallel.

Computer applications, particularly some graphics applications, may execute as multiple divergent shards. In warp-based SIMT execution environments, certain types of these applications may have the following characteristics: (1) latency sensitivity; (2) high thread divergence; and (3) low warp occupancy. The term "computer application" should be understood to mean any executable software instructions stored in machine memory and executed by one or more computer processors.

For example, in ray tracing applications, when a ray encounters a surface, it may trigger a shader that processes the interaction between the ray and the surface, which may result in the generation of additional (e.g., reflected) rays. These actions can cause thread divergence, which can lead to low warp occupancy. Ray tracing applications are typically sensitive to computational performance and are thus an example of applications that may experience high thread divergence, latency sensitivity, and low warp occupancy.

Techniques are disclosed herein to reduce the effect of pipeline stalls between divergent threads in a warp by utilizing shard switching to interleave the execution of the divergent threads. Shard switching refers to the switching of serialized execution from a first shard to a second shard that is diverged from the first shard.

Also described herein are mechanisms to identify producer or consumer thread locations that result in long stalls, mechanisms for shard scheduling, and mechanisms to switch control between shards including mechanisms to save/restore shared state values. To more clearly describe these techniques, an introduction to some terminology is provided.

A pipeline stall is a delay introduced by a long-latency instruction into the execution pipeline of a pipelined machine instruction processor. A long-latency instruction is an instruction the execution of which results in a long stall. An instruction may be a long-latency instruction due to the latency of executing the instruction itself (e.g., complex microcoded instructions), or because the instruction carries out fetches from slow (e.g., non-cache) memory devices of operands needed by downstream instructions. The location of the long-latency instruction is its position in the execution sequence of a thread.

A long stall is the pipeline delay introduced by a long-latency instruction. A memory stall is a long stall generated by a memory load instruction, for example from a load instruction that results in a cache miss and thus retrieval of an operand from a slower memory device.

A long stall is determined based on the latency required to complete an instruction in relation to the time required for shard switching. What constitutes a long stall may be readily determined from the latency of the shard switching implementation on a particular platform. For example if the completion time of an instruction is expected to be less than or within a threshold margin of the time to switch execution between shards then it may not be considered to be an instruction that will produce a long stall. This may be determined for example via execution profiling or because it takes a known amount of fixed time to complete execution of the instruction, for example. A long stall may also be characterized by the pipeline cycles needed to complete execution of the instruction. A threshold value of pipeline cycles may be used to determine whether an instruction qualifies as an instruction that generates a long stall that triggers shard switching. Note that not all "slow" instructions (such as loading un-cached data from system memory) may generate a long stall; the compiler or other pre-execution logic (or a human programmer) may insert sufficient instructions between a long-latency instruction (the producer) and an instruction that utilizes results of the long-latency instruction (the consumer) such that the long-latency instruction does not result in a long stall in the execution pipeline. Alternatively or additionally, there may be sufficient warp occupancy during the execution of a long-latency instruction to switch execution to an entirely different warp.

The disclosed techniques exploit the thread divergence inherent in sharded applications to reduce the impact of long stalls. The techniques operate to switch control between shards having diverged execution paths when an executing shard encounters a long stall instruction. The techniques may improve the interleaving of the execution of divergent threads within a single warp to improve pipeline efficiency, lower latency, and increase data cache locality.

Warps may diverge into shards in SIMT environments due to the use of if-else conditionals and looping constructs, for example. Additionally, individual threads may access different cache lines and possibly exhibit latency differences when the different cache lines hit or miss at different levels of the memory hierarchy. The shard scheduling techniques described exploit such execution conditions.

In some cases, it may be advantageous to introduce divergence among shards so that the described techniques may be brought to bear. For example, decoupled software pipelining (DSWP) is a multithreading technique that in one form splits a single thread into a critical path thread (CP) and an off-critical path thread (off-CP). When applied to SIMT execution, DSWP may pack two threads' worth of work into a single thread and may take the following form:

```
If (threadId < 16) {
    CP_H0( ); // for first half of the original warp-wide instruction i.e. original threads 0-15
    CP_H1( ); // for second half of the original warp-wide instruction i.e. original threads 16-31
} else {
    Off_CP_H0( ); // for first half of the original warp-wide instruction i.e. original threads 0-15
    Off_CP_H1( ); // for second half of the original warp-wide instruction i.e. original threads 16-31
}
```

This introduces divergence even without branching or loop conditions, necessarily. It enables all active warps in a streaming multiprocessor to first complete their critical path work (initiate critical path memory loads) and then use shard switching to make progress on off-critical path work ("else" part). The disclosed techniques may be applied in such thread packing implementations.

A subset of threads in a warp may saturate a critical execution resource for a period of time. Examples are memory traffic (use of memory bus) and cache utilization. In these saturation situations, which may be detected at runtime or via profiling, there may be benefits to splitting the execution of the warp into shards and scheduling execution of the shards such that they are interleaved in their execution. The disclosed techniques may be utilized in these circumstances to detect or predict the execution stalls that might result from resource saturation and perform shard switching to mitigate the impact.

Techniques to identify long stall locations in shards include logic embodying rules and/or procedures to characterize such locations in code, such as might be implemented in a compiler. These techniques may be prone to "false positives"—identifying locations that do not in actuality cause long stalls during execution of the shard. For example, a load instruction for data from memory may result in a long stall if the data is located in slower main memory during execution, but the same load instruction does not create a long stall if the data has been cached at the time it is utilized by an instruction. There may not be sufficient information about cache utilization available at compile time to determine if such an instruction results in a long stall. However it may be possible to obtain enough information via execution profiling to accurately predict long stall locations. An application run-time profiler may collect information on performance of the threads and provide that information to a compiler or human programmer to guide the prediction of long stall locations in threads.

Another technique for identifying long stall locations in threads utilizes hardware logic to respond to long stalls as the threads are executed. The hardware scheduler for threads in a warp may respond to detected long stalls to save and restore shard context and schedule an idle (and ready) shard to execute while the long stall persists. An issue with this technique is that the hardware scheduler may need to monitor every instruction execution to detect or predict a long stall, increasing thread execution overhead. Another issue with this technique is the added hardware cost (circuit size, power consumption etc.) associated with a more complex hardware scheduler.

A compiler, profiler, or human programmer may introduce hint instructions into the threads at predicted locations for long stalls. The hint instructions are low-latency instructions that alert the scheduler of the likelihood of encountering a long-latency instruction. Hint instructions may be inserted in association with the "consumer" instructions of operands that are potentially high-latency to produce. For example, a producer memory load instruction may result in a downstream memory stall at a consumer of the fetched data due to the fetched data not being cached. The consumer of the loaded operands may be a subsequent instruction in the thread, and the hint may be placed in association with (e.g., adjacent to, or within a small number of instructions away from) that consumer instruction. In some cases the hint may be placed adjacent to the producer instruction instead. The shard switch may occur reactively when a long stall is actually encountered, or speculatively based on the hint before the long stall is encountered.

A long-latency instruction may not always result in a long stall in the execution pipeline if other independent instructions (those not dependent on the results of the long-latency instruction) are scheduled between the long-latency instruction and its consumer instruction, or if another warp can be scheduled while the long-latency instruction completes. Therefore upon being alerted by a hint of the possibility of a long-latency instruction, the scheduler may check at runtime if in actuality the instruction is likely to introduce a long stall into the execution pipeline before performing a context switch to execute another shard. A hybrid software/hardware technique of this variety may miss some long stall instructions but also does not incur the overhead of checking every instruction for long stall behavior. Those skilled in the art may appreciate that any number of hint instruction embodiments are possible and readily implemented depending on the platform instruction set architecture.

In one embodiment shard scheduling is based on a round-robin algorithm. In another embodiment, the next ready (not stalled) and idle shard to execute is scheduled. In yet another embodiment, the properties of idle shards may be examined to determine which may be most efficient to execute next. For example, a shard awaiting a certain type of instruction or processed using a certain resource may be selected or not based on the availability of resources (memory, GPU, bandwidth, etc.) and how these resource needs may best be interleaved or best utilize shared parameters. These characteristics may be codified in metadata for the instructions, or instructions may be profiled during compilation or run time, or some through some other method. An application may be profiled by a run-time performance monitor to obtain performance characteristics including warp execution efficiency, memory instructions generating long stalls, and warp occupancy. In one embodiment, a profiling tool such as Nvidia Nsight may be used to characterize instructions that may incur a long stall. The profiling tool may examine hardware clock counters to track the completion of individual instructions or aggregated tasks.

In each scheduling variety a technique may be utilized to enable fast context switching from a currently executing shard to the next-scheduled shard. Such fast context switching techniques are known in the art. For example, many techniques store and retrieve thread/shard context in a cache memory or register file. Hardware logic, which tends to be faster, may be utilized for saving and restoring state, while software logic may implement all or parts of the scheduling algorithm.

In some approaches the shards that encounter a long-latency instruction may yield control to the thread scheduler using a variety of techniques. In general, such techniques may vary according to the execution platform implementation and instruction set architecture. On certain GPU platforms provided by Nvidia, a YIELD or RELINQUISH instruction, or variation thereof, may be utilized to relinquish control from a shard back to the hardware scheduler, which in response initiates execution of an idle shard based on its scheduling algorithm. "Relinquishing control" refers to suspending execution of a thread (or thread group) in order to execute another thread (or thread group). In some embodiments, the YIELD or RELINQUISH instruction may be modified from its conventional form in order to prevent behaviors such as breaking execution barriers used to improve thread convergence. Those of skill in the art will readily recognize techniques for implementing YIELD and RELINQUISH behavior without affecting execution barriers.

In implementations on Nvidia platforms, a jump-to-PC (JPC) instruction may be used to implement shard switching. JPC instructions may enable stalled shards to relinquish execution to waiting shards by switching execution to the divergent PC of an idle shard. Implementations of JPC that may be adapted or used for this purpose on Nvidia and other platforms will be readily apparent.

In some implementations the hardware scheduler may determine the conditions to switch execution to an idle shard upon detecting a long-latency instruction (or a hint of one inserted pre-execution, e.g., by a compiler as optionally guided by an execution profiler/performance monitor). In a hybrid hardware/software implementation in one embodiment, a combination of YIELD or RELINQUISH instruction or variation thereof may be utilized along with one or more ISA instructions to read scoreboard values. Scoreboards are known mechanisms for tracking and issuing instruction execution based on the satisfaction of conditions, such as the availability of operands, in pipelined machine instruction processors. Instructions to relinquish control, to establish and manage execution barriers, and other programming techniques and mechanisms to cooperatively execute threads and shards are known in the art (see for example granted U.S. Pat. No. 10,067,768).

Scoreboards may utilize a count of computational operations needed to complete an instruction and may count down each time one of these operations completes. When the scoreboard arrives at "0", it indicates that an associated instruction has completed. Using scoreboard values to determine whether or not an idle shard should be executed during a potential stall faces the drawback that conventional scoreboard counters track an aggregate of operations at the warp level, and may therefore take longer to reach zero based on the operation count of a single shard instruction, as other instruction counts may be added before the shard of interest completes. The use of global (warp-wide) scoreboards may result in aliasing that slows the execution of some shards. In order to improve the execution efficiency of interleaved shards when using scoreboards for stall tracking, multiple scoreboards may be implemented such that each shard or each thread in a warp has its own scoreboard. This may improve the execution performance of sharded applications at the cost of increased hardware size. In some cases, software instructions for reading these scoreboards may be implemented, in manners known in the art.

In some situations divergent shards may share some state data. For example, in some implementations there may be registers dedicated to maintaining shared state variables for multiple shards. In other cases shards may evolve into unique states during execution. Shared state values may be copied to shard-local state memory so that shard-specific modifications to them won't propagate to other shards. Conventional scoping mechanisms may be utilized to limit certain values to particular shards. Techniques for protecting shared state of threads or groups of threads may be readily implemented according to the platform capabilities and requirements.

In conventional sharded implementations the shard state values may be stored in registers or other memory. When a new shard is processed, updated state values may be written to the memory to replace the previous shard state values. This shared state configuration enables data for multiple shards to be stored using a reduced hardware cost. The cooperative shard interleaving methodologies disclosed herein may be implemented such that the state values of a stalled shard may be retained elsewhere in memory while enabling values for a next shard to execute to be loaded into the shared state memory. Low-latency, local thread memory or thread data registers may be utilized to accomplish this in various embodiments. In another embodiment, shards may each access their state values from particular assigned registers, rather than a shared state register, which may be accomplished by disabling uniform register usage. These solutions may have a hardware penalty and/or may incur additional latency.

In addition to shared state registers, barrier registers that facilitate the reconvergence of threads and shards may experience conflicts should a shard further subdivide into two child shards (due to thread divergence within the parent shard). Each of the sub-shards may compete to overwrite their data to their shared barrier register. The techniques described herein may be supplemented by saving and restoring barrier register information as sub-shards split and reconverge.

FIG. 1 depicts shard divergence 100 in one embodiment. SIMT execution of an application in a warp executes the same instruction of the threads in parallel. This causes execution of the warp to split into shards and serialize when a divergence point is reached in the application. Execution reconverges at some later point when the threads have an instruction in common.

In the shard divergence 100 example, the application code 102 includes a divergent branch dependent on thread-local values (the value of the thread id, threadldx.x). The warp 104 for the application code 102 splits into divergent threads 106 at the condition evaluation, resulting in thread divergence 108 into a first shard 110 of four threads executing instructions A and B, and a second shard 112 of a different set of four threads executing instructions X and Y. The serialized execution of the shard 110 and the shard 112 is referred to as warp sharding 114. Thread reconvergence 116 of the warp 104 occurs at instruction Z, warp sharding 114 ceases, and threads of the warp 104 execute again in parallel.

Figure 2:
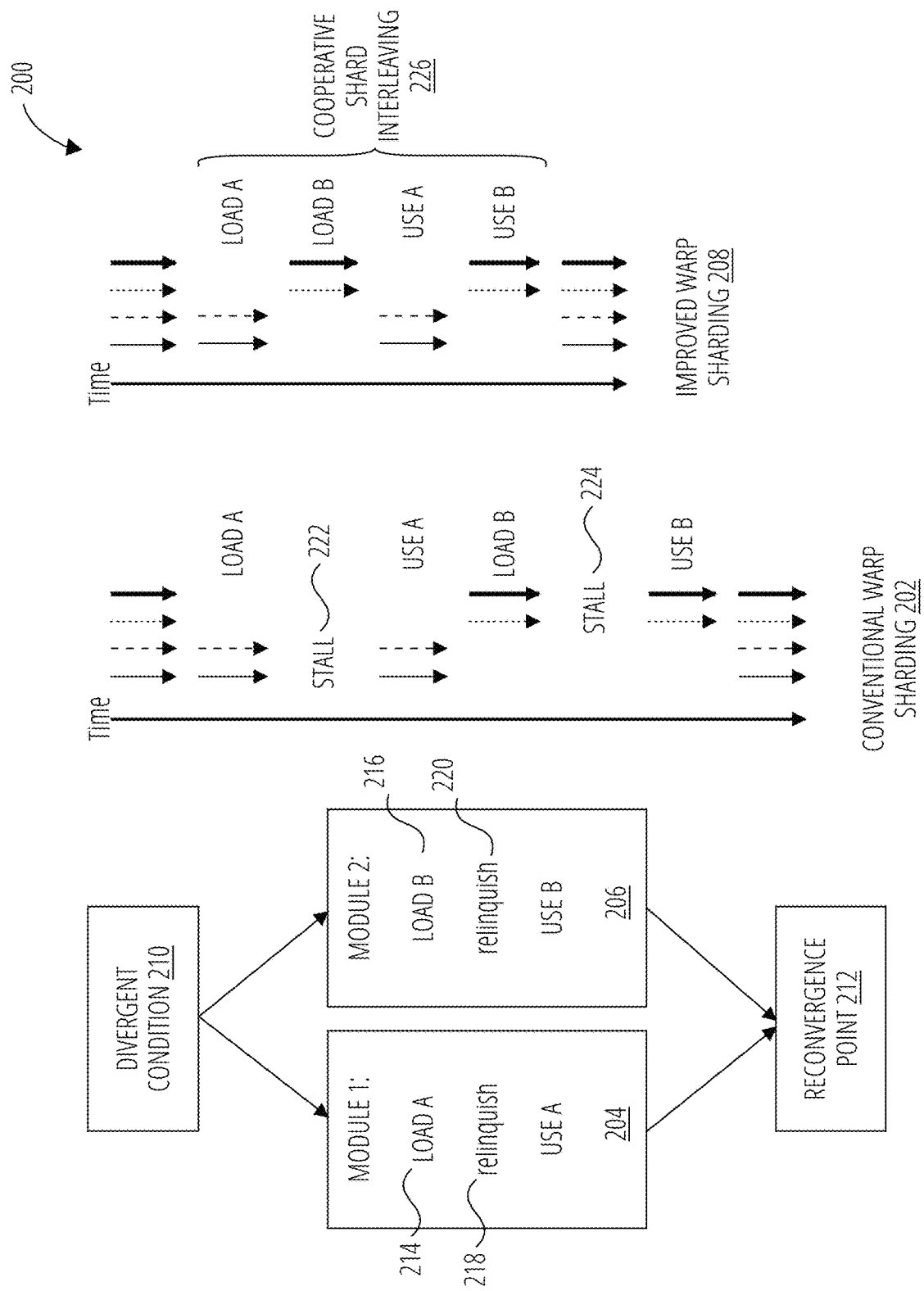
FIG. 2 depicts an application with warp sharding 200 in accordance with one embodiment.

FIG. 2 depicts a comparison of examples of convention and improved application with warp sharding 200 according to one embodiment. The application with warp sharding 200 example involves an application executing as a four-thread warp that invokes one of two different modules (e.g., shaders for ray tracing applications) depending on thread-local data values. "Module" refers to logic having configured invocation interfaces such that the module may be invoked as a unit using those interfaces (e.g., by passing operands and receiving results via those interfaces). Examples of modules are subroutines and function calls, as known in the art.

The conventional warp sharding 202 execution flow depicts stalls in the pipeline where first module 204 and second module 206 wait for long-latency instructions to finish execution. The improved warp sharding 208 execution flow, utilizing the disclosed mechanisms, depicts shard switching to reduce the inefficiency of these stalls by pipelining the execution of long-latency instructions across modules in the application.

The application code comprises a divergent condition 210 at selection of the first module 204 or the second module 206. Threads executing the first module 204 are executed in a first shard and threads executing the second module 206 are executed in a second shard. In this example there are two threads in each shard. Because the execution of the threads is SIMT, execution of the first shard and the second shard is serialized. Execution of the shards reconverges at reconvergence point 212.

A conventional warp sharding 202 execution is depicted along side an improved warp sharding 208 execution. The improved warp sharding 208 uses Shard switching to mitigate stall times of the long-latency instructions in the modules (long-latency instruction 214 in first module 204 and long-latency instruction 216 in second module 206).

The first module 204 comprises an instruction to relinquish control 218. The second module 206 likewise includes an instruction to relinquish control 220. Generally, "relinquish" may be understood to be any instruction or instructions in a thread to initiate a shard switch. A shard switch may not actually occur upon carrying out "relinquish", for example if the hardware scheduler determines that the shard performing a "relinquish" should continue to execute. However "relinquish" provides the opportunity for the hardware scheduler to perform a shard switch.

The conventional warp sharding 202 is an example of execution flow without these instructions, whereas the improved warp sharding 208 depicts an example of execution flow with these instructions included in the first module 204 and second module 206.

In the conventional warp sharding 202, the long-latency instruction 214 in first module 204 results in a pipeline stall 222 and the long-latency instruction 216 in second module 206 results in a pipeline stall 224. These memory stalls are serialized due to the SIMT execution of the different shards executing the first module 204 and the second module 206. In the improved warp sharding 208, Shard switching is activated on detection of the long-latency instructions in each shard, mitigating the effects of the memory stalls by cooperative shard interleaving 226. The execution convergence point in the application is thus reached faster, improving execution performance.

Figure 3:
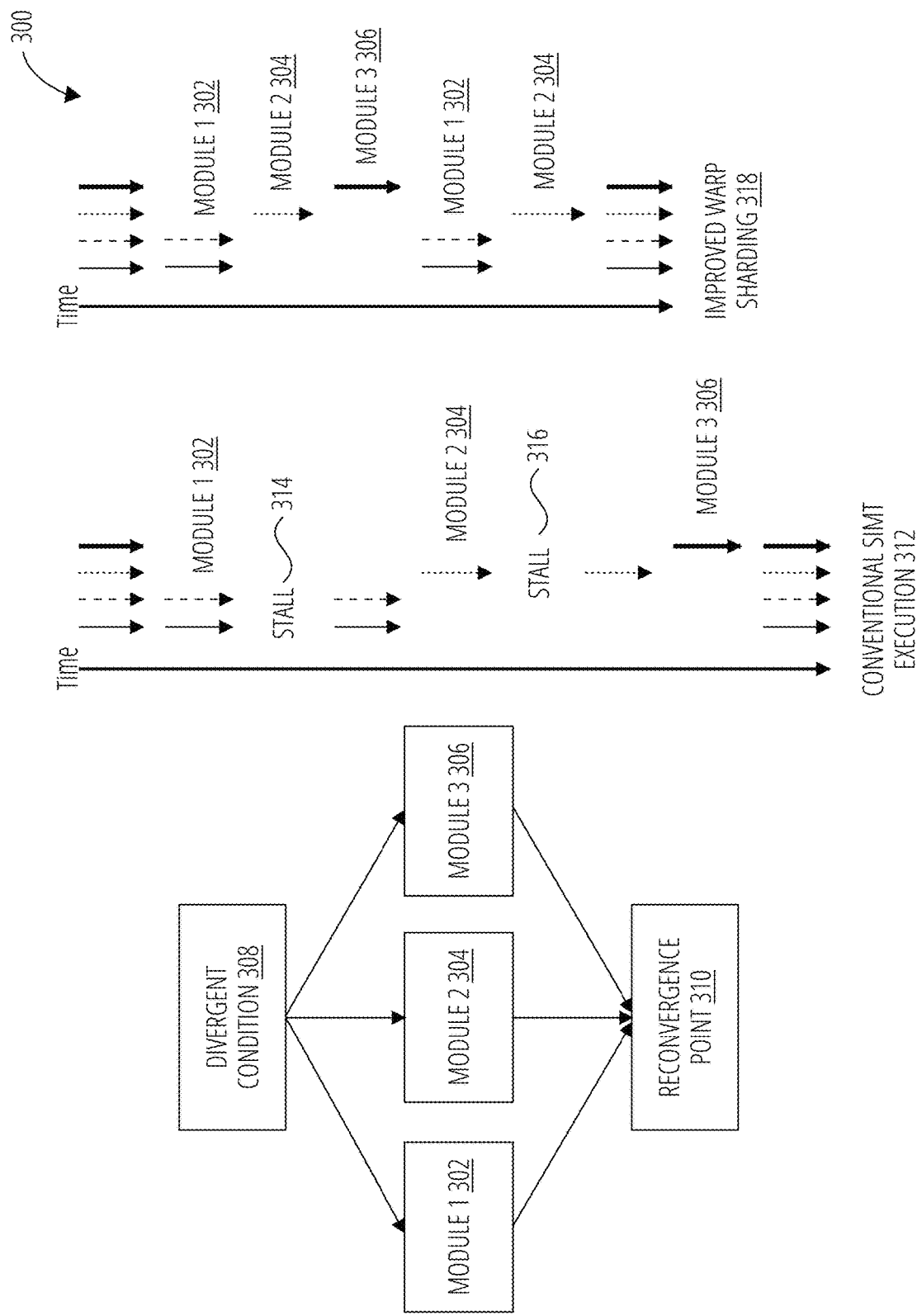
FIG. 3 depicts an application with warp sharding 300 in accordance with one embodiment.

FIG. 3 depicts another example of an application with warp sharding 300, in this case involving warp execution divergence into three shards invoking different modules (module 1 302, module 2 304, and module 3 306) at a divergent condition 308 that selects a specific module. The three shards reconverge at reconvergence point 310. The execution flow using conventional SIMT execution 312 incurs a pipeline stall 314 in module 1 302 due to a long-latency instruction and another pipeline stall 316 in module 2 304 due to a long-latency instruction. These pipeline stalls are mitigated in the improved warp sharding 318 execution flow by applying efficient shard switching techniques that are further described in conjunction with FIG. 4, FIG. 5, and FIG. 6.

Figure 4:
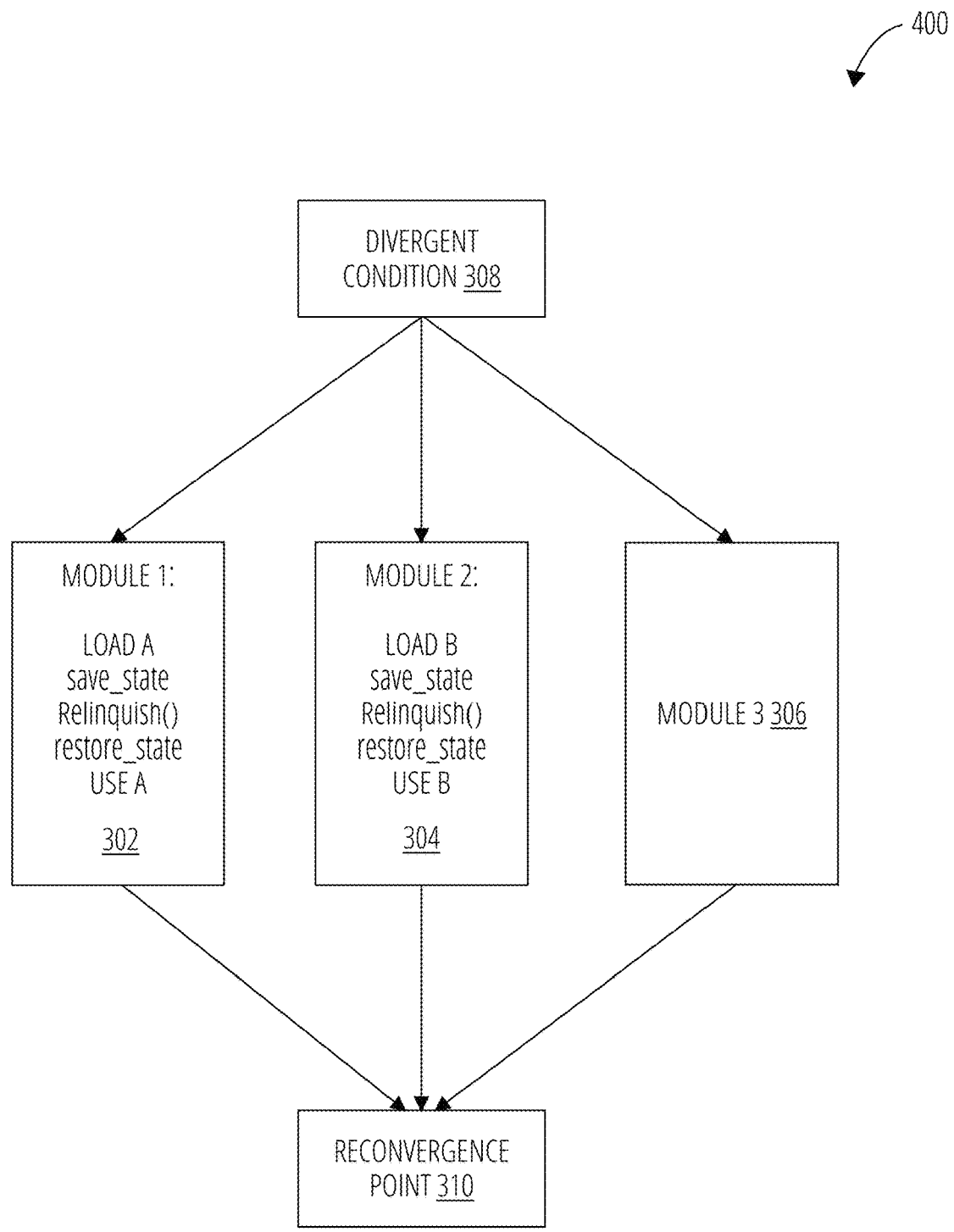
FIG. 4 depicts software-controlled warp sharding 400 in accordance with one embodiment.
Figure 5:
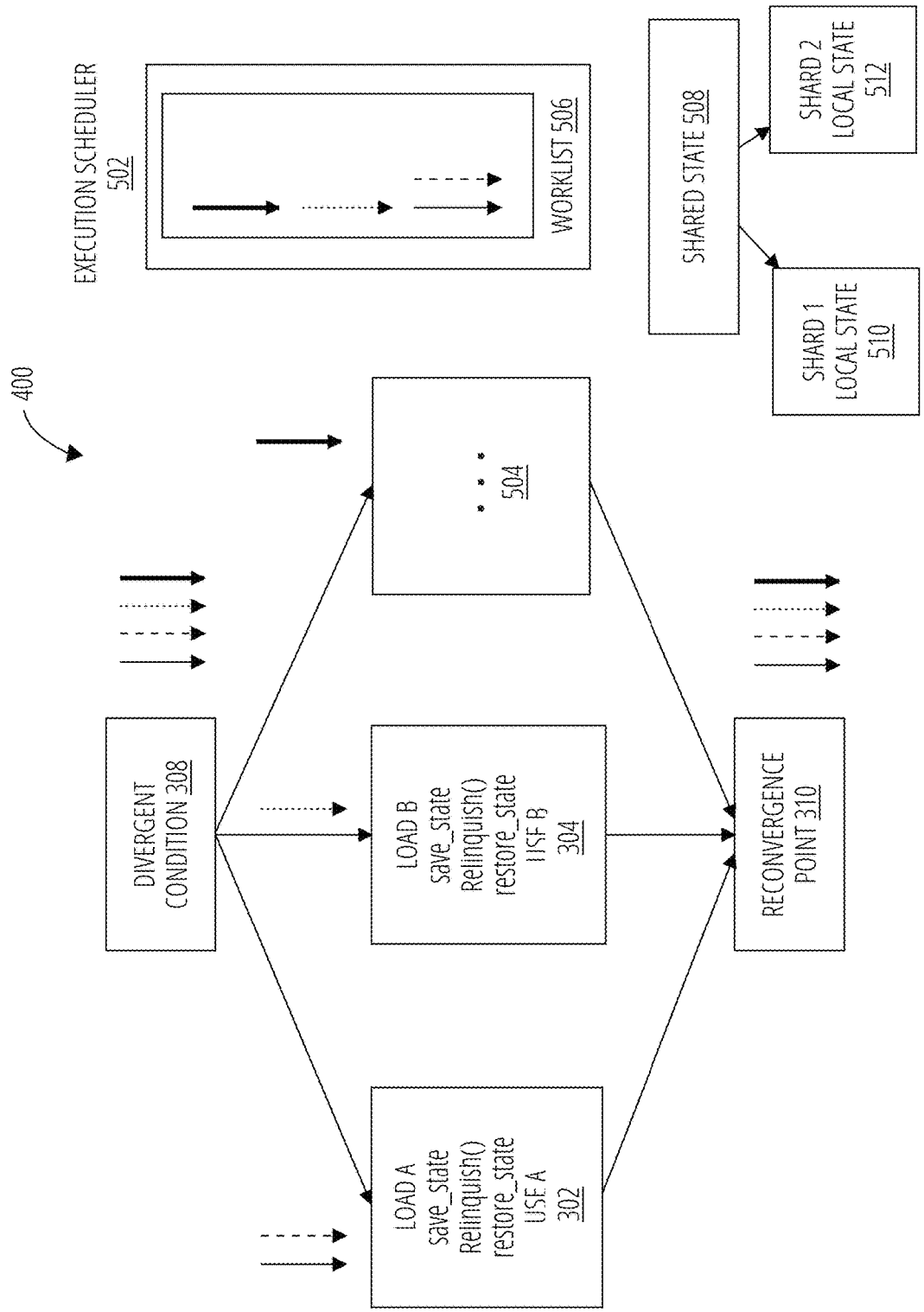
FIG. 5 depicts software-controlled warp sharding 400 in accordance with one embodiment.

FIG. 4 and FIG. 5 depict an embodiment in which execution is at least partially implemented by software-controlled warp sharding 400. Shard switching at a long-latency instruction involves initiating the long-latency instruction, saving shard state (shared state with other shards, and warp-wide state), relinquishing execution of the shard to the thread execution scheduler 502 (which may be implemented in hardware, software, or a combination thereof), and then restoring the shard state upon resumption of execution of the shard. The execution scheduler 502 selects a next shard to execute from among the waiting shards 504 based on its scheduling algorithm and worklist 506.

Figure 6:
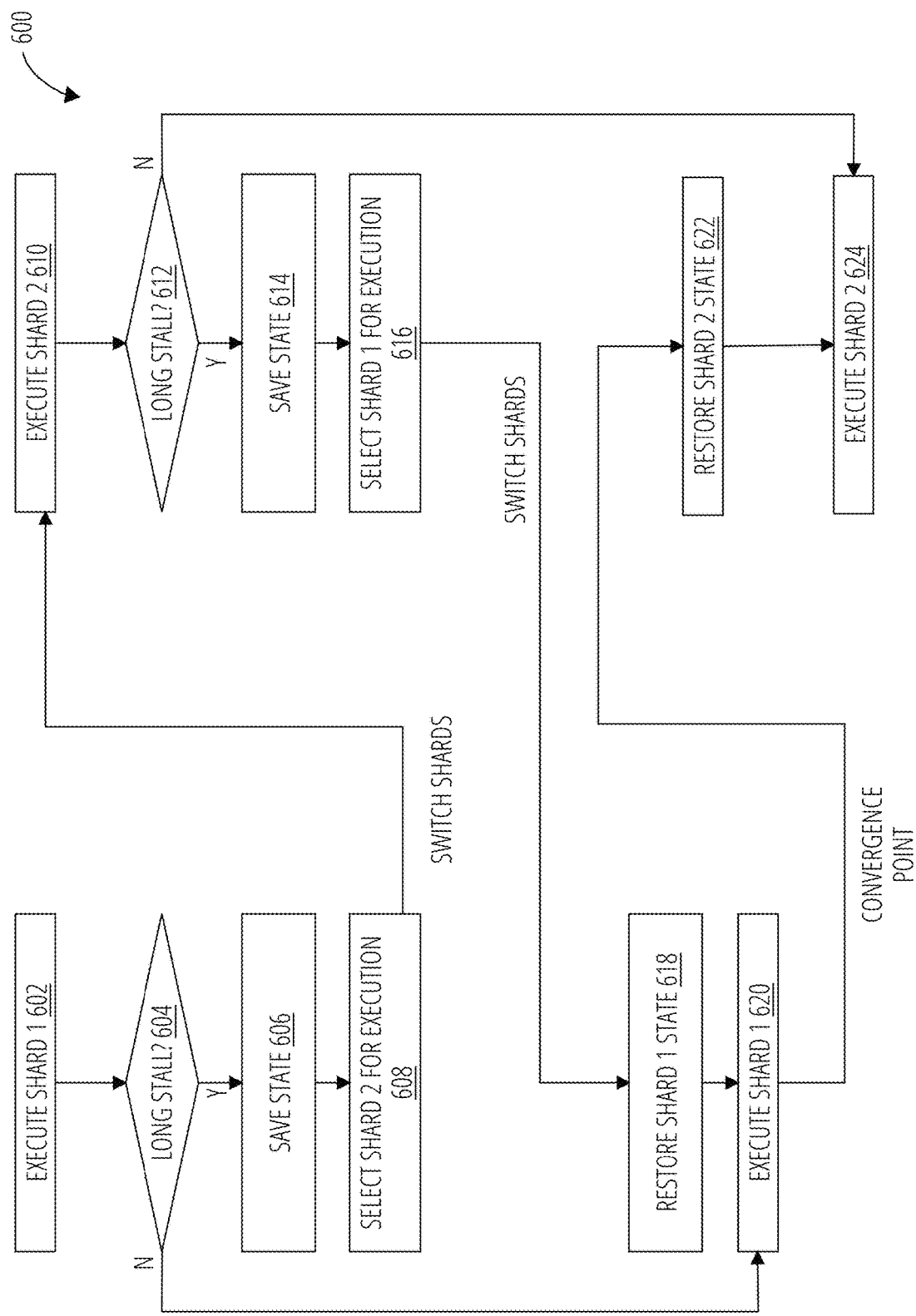
FIG. 6 depicts a shard switching process 600 in accordance with one embodiment.
Figure 7:
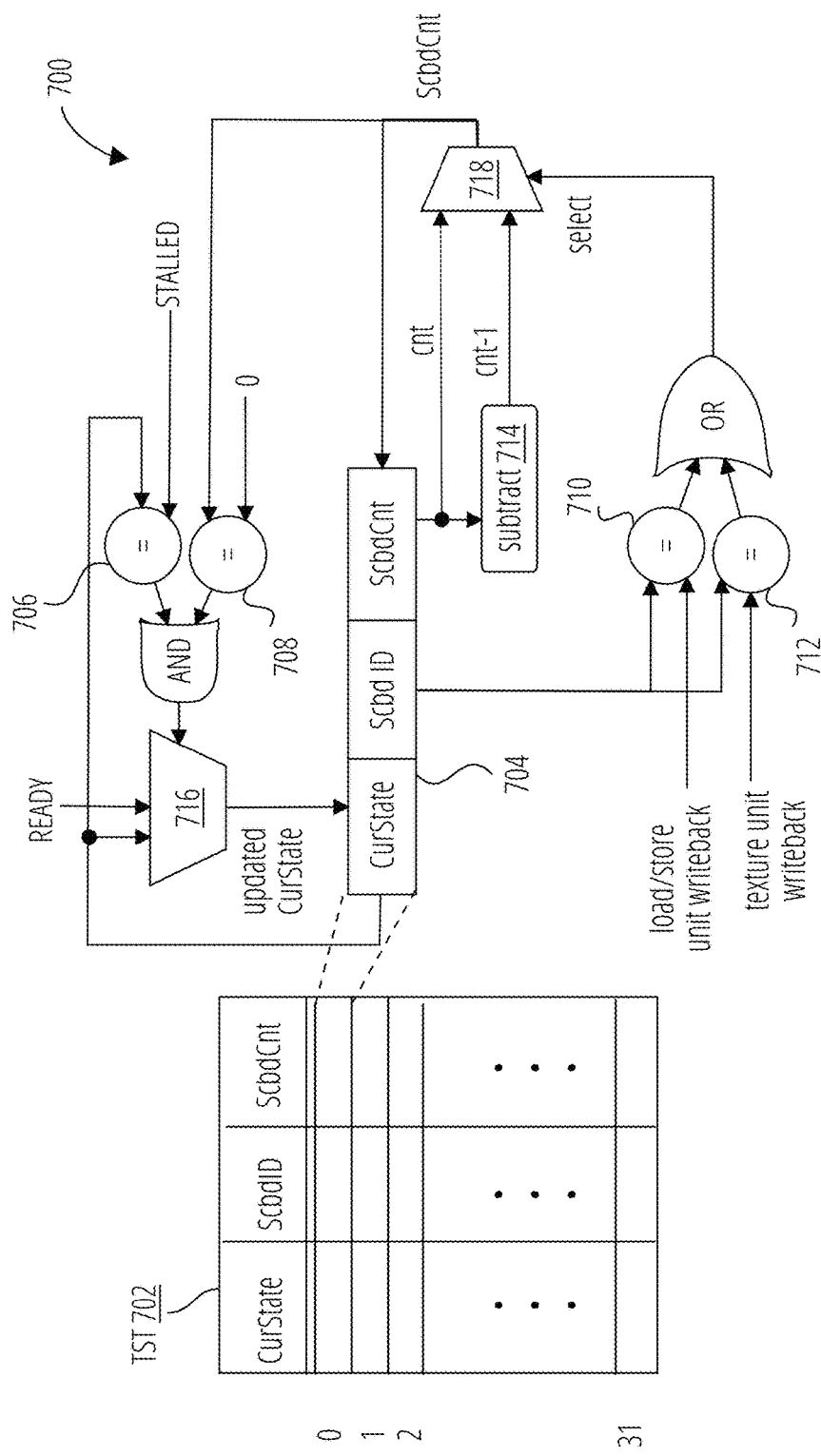
FIG. 7 depicts a shard scheduler 700 in accordance with one embodiment.

FIG. 6 depicts a shard switching process 600 between two divergent shards in one embodiment. At block 602, one of the shards (shard 1) is executing. Because the execution is SIMT, and shard 2 is divergent (different instructions up for execution), shard 2 is waiting and not executing while shard 1 executes.

In the context of a ray tracing application, the shard switching process 600 may be viewed as a process to select the next shader to switch to and a mechanism to relinquish control to said shader. In one embodiment, the compiler or other pre-execution logic determines when and how to relinquish control in a thread and what thread/shard scheduling logic to use, and generates instructions to save any shared state. The pre-execution logic determines locations to insert calls to whatever instruction the platform utilizes to relinquish( ) execution from a thread. Before relinquishing control, the hardware and/or software (e.g., hardware scheduler and/or thread, depending on the implementation) stores the state of currently executing threads and resumes the program counter on the next shard from a worklist of ready shards.

The pre-execution logic, or the run-time scheduler (depending on implementation) generates instructions to save and restore any warp-wide shared resources that may conflict with the execution of another shard from the same warp. To facilitate this, the shared state 508 for two divergent shards may be copied to shard-local memory (e.g., shard 1 local state 510 and shard 2 local state 512). If the latency cost of save-restore is too high, a thread (using instructions inserted pre-execution) or the hardware scheduler may conditionally choose to not switch to executing another shard. The increase in register utilization due to save-restore may negatively impact warp occupancy, but shard switching may mitigate this loss to some extent.

The pre-execution logic may not have sufficient information to determine which instructions may stall execution and may either rely on heuristics or profile information to select ideal relinquish locations in a thread. The pre-execution logic may also arrange the instructions of the thread(s) to batch together long latency instructions, then relinquish control at the end of the batch to reduce the amount of shard switching that occurs.

At decision block 604, on condition that shard 1 encounters a long-latency instruction during execution, the state of shard 1 is saved at block 606 and the scheduler selects shard 2 for execution at block 608. Execution is switched to shard 2 at block 610.

At decision block 612, on condition that shard 2 encounters a long-latency instruction, the state of shard 2 is saved at block 614 and shard 1 is again selected for execution at block 616. By this time, the long-latency instruction in shard 1 may have completed and shard 1 is ready to continue executing.

The state of shard 1 is restored at block 618, and shard 1 continues to execute at block 620. A convergence point in the execution may be reached at which time shard 2 may have its state restored at block 622 and may resume execution in parallel with shard 1 at block 624—in effect, shard 1 and shard 2 cease to exist and execute independently at the convergence point.

Figure 8:
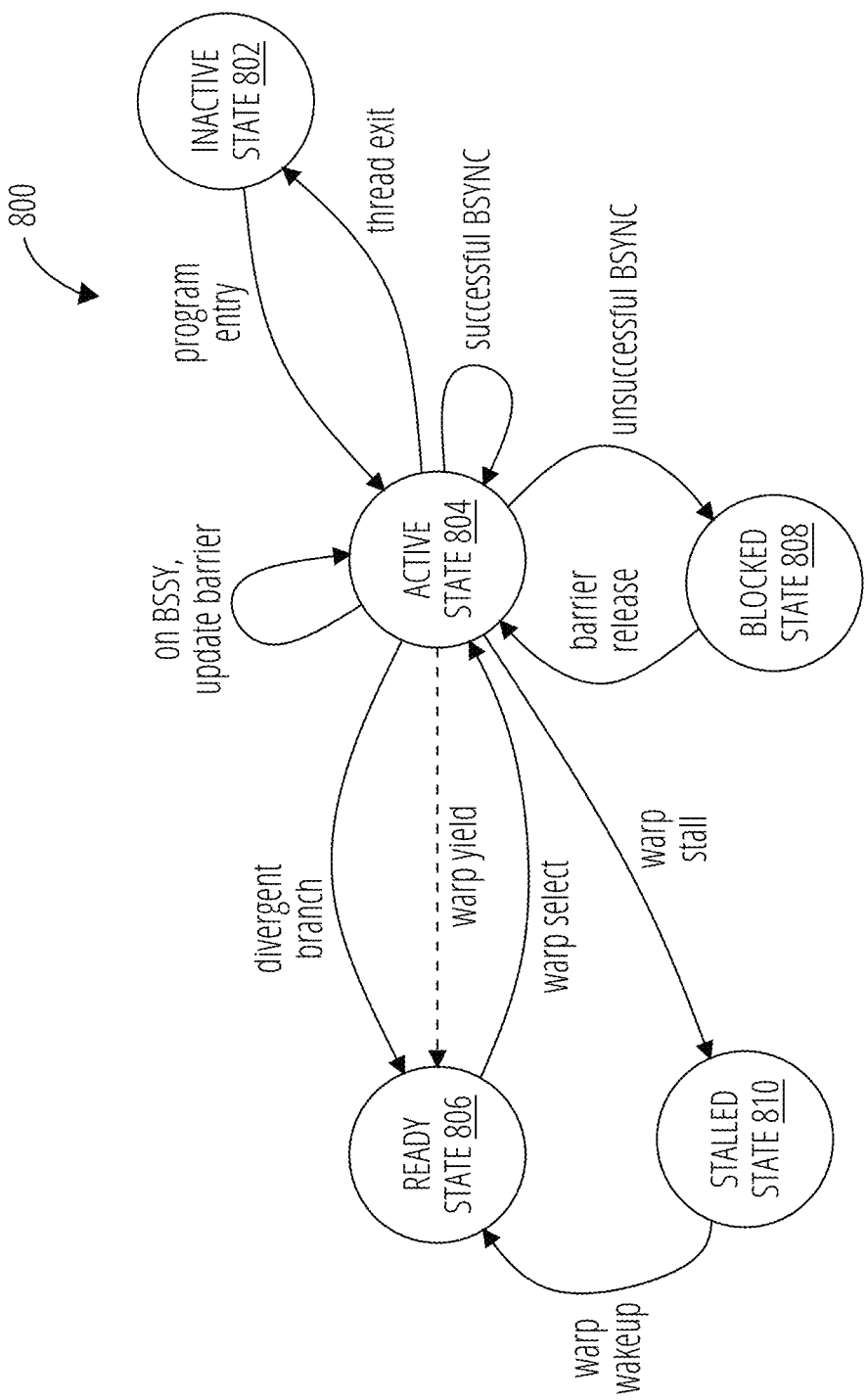
FIG. 8 depicts a state machine 800 in accordance with one embodiment.

With reference now to the state machine 800 of FIG. 8, in some conventional thread schedulers, threads begin in an INACTIVE state 802. On program entry, the threads transition to the ACTIVE state 804. If/when an execution barrier is established (e.g., by executing a BSSY Bx operation on certain Nvidia platforms), the active threads register themselves on the barrier, e.g., by setting a per thread bit in the associated barrier register, Bx. Upon encountering a divergent branch during execution of the threads in a warp, the scheduler serializes the execution of the warp's shards. The scheduler chooses one shard for active execution by leaving that shard's threads in the ACTIVE state 804 and transitioning the threads of the other shards to the READY state 806, meaning they are idle, but ready for ACTIVE status. On encountering an execution barrier synchronization instruction, e.g., BSYNC Bx, a thread can remain in the ACTIVE state 804 if all threads participating in barrier register Bx are either in the BLOCKED state 808 or INACTIVE state 802. Otherwise, the thread transitions to the BLOCKED state 808.

When the shard of currently active threads transitions to the BLOCKED state 808, logic (e.g., in hardware) is activated to examine the statuses of the READY threads and selects one shard to transition from the READY state 806 to the ACTIVE state 804. This may be referred to as a shard-select transition.

In one embodiment, a shard scheduler 700 to provide shard execution interleaving includes a new state for threads/shards, called the STALLED state 810, and three new types of transitions, namely, shard-stall, shard-wakeup, and shard-yield. The shard-yield transition may be optionally included to provide extra shard scheduling flexibility between the ACTIVE state 804 and the READY state 806.

The shard-stall transition takes place between the ACTIVE state 804 and the STALLED state 810. Shards that encounter memory stalls cannot make forward execution progress until their memory read instructions return results. Rather than occupy a warp's scheduling slots, threads of stalled shards move to the STALLED state 810.

The shard-wakeup transition occurs between the STALLED state 810 and the READY state 806. Stalled shards are made ready for execution by the scheduler using, in one embodiment, logic that continually polls shard-specific scoreboards for successful completion of outstanding long latency operations from threads of such shards. Threads thus woken up are now eligible to transition to the READY state 806. The scoreboards can be per-register completion trackers or count-based scoreboards, which are low-complexity dependency trackers that leverage in-order completion of memory operations to infer bulk completion of one or more operations based on outstanding counts.

The shard-yield transition enables a shard to yield its scheduling slot to another shard of the same warp. This transition may be implemented through an explicit software directive, such as via the explicit RELINQUISH or YIELD instruction, or encoded as a scheduling hint in the instruction stream, or via a fixed set of policies implemented in the scheduler. An example of the latter is to yield after issuing a configurable threshold of long latency operations (such as texture lookups or global memory loads) or operations to core-level shared functional units, such as those executing transcendental operations. This will cause the threads of a shard to transition from the ACTIVE state 804 to the READY state 806.

Shard interleaving involves tracking individual threads' states to determine shard scheduling decisions. Shard interleaving also involves waking up threads for READY status on condition that their data dependencies are satisfied. To meet these twin requirements, a shard scheduler 700 may comprise or utilize a thread status table 702. The thread status table 702 integrates settings utilized to perform both the shard-wakeup and shard-select transitions. The thread status table 702 comprises dedicated storage for each thread's current state and scoreboard information, namely, scoreboard ID (ScbdID, s bits) and current count (ScbdCnt, t bits). The ID bit count, s, depends on the number of counted scoreboard trackers a design uses, and the count bit count, t, depends on the maximum number of outstanding operations a single scoreboard counter is expected to track. For a stack-based architecture, an additional program counter (PC) field may be utilized in each entry (row) of the thread status table 702. This may be omitted in convergence barrier-based implementations that maintain per-thread PCs in reserved registers accessible as needed by the shard scheduler.

Count-based scoreboards may be allocated by the compiler as part of software-managed dependency handling in some processors, such as Nvidia GPUs. A scoreboard count, typically used with a variable latency operation such as a memory lookup, is incremented when an associated operation is issued and decremented when the associated operation writes back. A dependent consumer blocks execution until an appropriate compiler-tagged scoreboard counts down to a desired value. If there are ordering guarantees for the producer operation, a non-zero scoreboard count may be specified. If not, the dependent operation may wait until the scoreboard counts down to zero. This enables register writes guarded by to scoreboard to complete and the makes corresponding registers safe for reuse by other instructions.

If two or more shards use the same warp-granular scoreboard ID and get interleaved in execution, the increments and decrements of that scoreboard will get interleaved too. Any dependent operation in a shard awaiting this scoreboard to count down to, say, 0, might end up waiting for other shards' outstanding memory lookups to also complete (since they too increment and decrement this scoreboard ID), thereby negating any gains from interleaving. The scoreboarding logic in some embodiments may thus implement per-thread scoreboards. A shard-stall transition occurs in response to an instruction checking if a particular scoreboard counter, SB, has counted down to a desired value, and failing that check. As part of the shard-stall transition, the thread status table 702 records the ID for SB and its current counter value, in the scoreboard ID and scoreboard count fields, respectively, for applicable threads.

Thereafter, when a shard writes back a scoreboard-protected operand to the vector register file, in addition to updating the main set of per-thread scoreboards located in the warp scheduler, those scoreboard IDs may be communicated to the thread status table 702 as well. Each thread status table 702 entry (e.g., thread status table entry 704) has associated wakeup logic that compares the broadcast scoreboard IDs with the recorded ID in the entry. If any of the broadcast IDs match with the recorded entry, the recorded count is decremented by one. Otherwise, the earlier value for the count field is retained. When a thread status table 702 entry's scoreboard count field reaches zero and its current state is the STALLED state 810, the entry transitions to the READY state 806. Assuming, for example, two writeback paths for long-latency operations, one from a texture unit and another from a load/store unit, the thread status table 702 may support a total of, for example, 128 comparators for wakeup (i.e. 32 entries×4 comparators per entry). In the depicted shard scheduler 700, these are comparator 706, comparator 708, comparator 710, and comparator 712. Each thread status table 702 entry may utilize subtraction logic 714 to decrement the scoreboard count on a successful scoreboard ID match, for a total of 32 subtractors per thread status table 702 on platforms configured to execute 32 thread warps. Additionally, a number of multiplexers (e.g., 64, for 32 entries×2 muxes per entry) may be utilized to correctly update the current state field of the thread status table 702. In the depicted shard scheduler 700, these are multiplexer 716 and multiplexer 718.

Figures 9A, 9B:
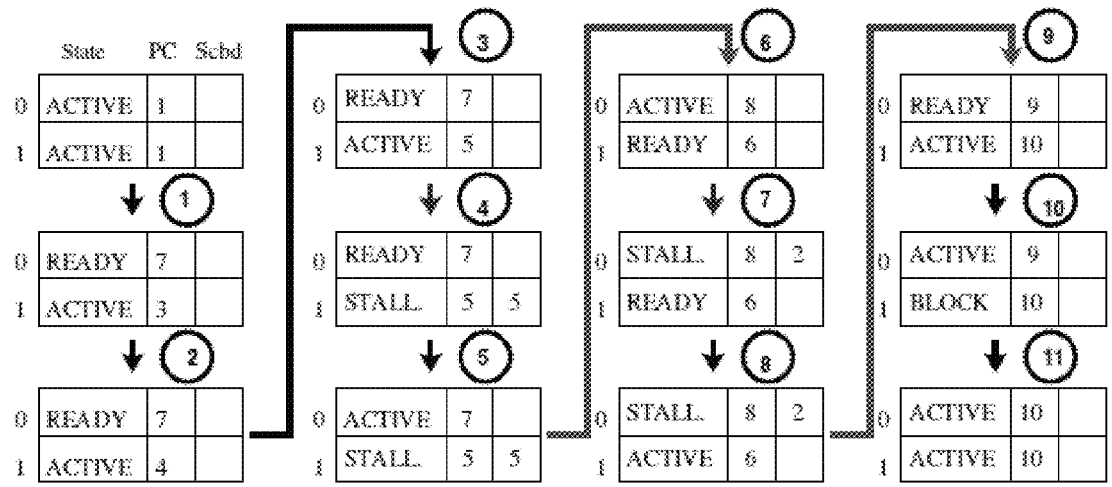
FIG. 9A depicts an exemplary thread section including a long-latency instruction and execution barriers.
FIG. 9B depicts thread scheduling in accordance with one embodiment.

FIG. 9A depicts a thread section including a long-latency instruction and execution barriers. FIG. 9B depicts thread scheduling for a thread comprising the thread section according to one embodiment.

In step 1, control flow diverges at the branch at PC 2. Prior to this, not shown in the figures, the BSSY B0, syncPoint operation is executed by both threads, t0 and t1, and the convergence barrier mask in B0 gets set to 0b11. After control flow diverges, thread 0 (t0) goes down the "else" path and its thread status table entry moves to the READY state. This divergence leads to the creation of a new shard. At step 2, thread 1 (t1) issues its long latency texture operation at PC 3 and remains in the ACTIVE state. At step 3, t1 successfully executes an independent math operation at PC 4. At step 4, t1 incurs a load-to-use memory stall and moves to the STALLED state. Thread 0 (t0) is selected by the scheduler in step 6 and issues a long-latency operation (PC 7) at step 5. It incurs a load-to-use stall in step 7. Meanwhile, in the background, t1's scoreboard stall condition clears and it is now eligible for selection. Thread t1 becomes ACTIVE in step 8, attempts to execute the BSYNC at step 9, and moves to the BLOCKED state in step 10.

The mechanisms disclosed herein may be implemented on computing devices utilizing one or more graphic processing unit (GPU) and/or general purpose data processor (e.g., a 'central processing unit or CPU). For example the improved warp sharding 208, software-controlled warp sharding 400, and shard switching process 600 may be implemented on such devices. Exemplary architectures are now described that may be configured to implement the mechanisms disclosed herein on such devices.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 10:
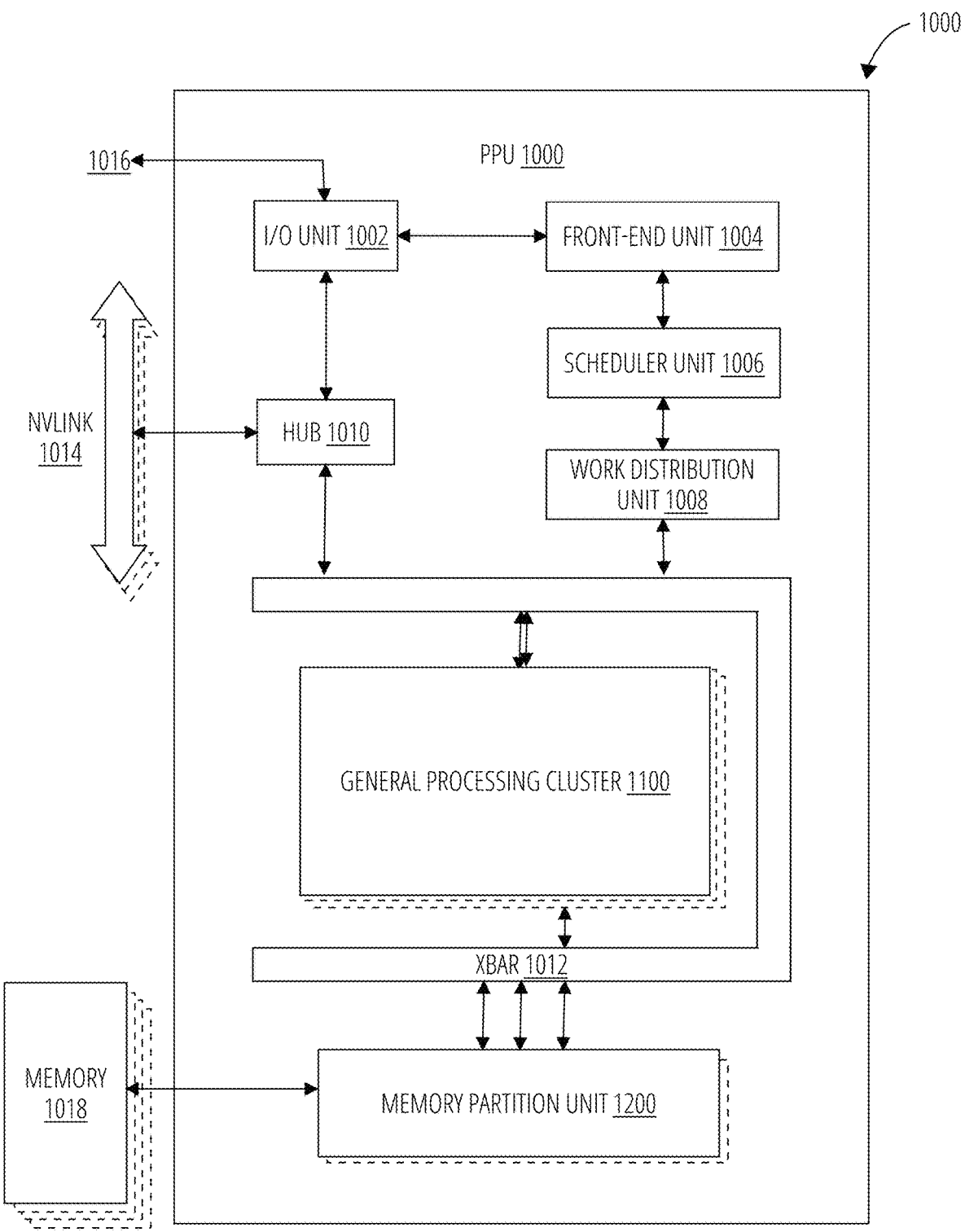
FIG. 10 depicts a parallel processing unit 1000 in accordance with one embodiment.

FIG. 10 depicts a parallel processing unit 1000, in accordance with an embodiment. In an embodiment, the parallel processing unit 1000 is a multi-threaded processor that is implemented on one or more integrated circuit devices. The parallel processing unit 1000 is a latency hiding architecture designed to process many threads in parallel. A thread (e.g., a thread of execution) is an instantiation of a set of instructions configured to be executed by the parallel processing unit 1000. In an embodiment, the parallel processing unit 1000 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1000 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1000 modules may be configured to accelerate thousands of High Performance Computing (HPC), data center, and machine learning applications. The parallel processing unit 1000 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 10, the parallel processing unit 1000 includes an I/O unit 1002, a front-end unit 1004, a scheduler unit 1006 (e.g., a hardware scheduler), a work distribution unit 1008, a hub 1010, a crossbar 1012, one or more general processing cluster 1100 modules, and one or more memory partition unit 1200 modules. The parallel processing unit 1000 may be connected to a host processor or other parallel processing unit 1000 modules via one or more high-speed NVLink 1014 interconnects. The parallel processing unit 1000 may be connected to a host processor or other peripheral devices via an interconnect 1016. The parallel processing unit 1000 may also be connected to a local memory comprising a number of memory 1018 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1018 may comprise logic to configure the parallel processing unit 1000 to carry out aspects of the techniques disclosed herein.

The NVLink 1014 interconnect enables systems to scale and include one or more parallel processing unit 1000 modules combined with one or more CPUs, supports cache coherence between the parallel processing unit 1000 modules and CPUs, and CPU mastering. Data and/or commands may be transmitted by the NVLink 1014 through the hub 1010 to/from other units of the parallel processing unit 1000 such as one or more copy engines, a video encoder, a video decoder, a power management unit, etc. (not explicitly shown). The NVLink 1014 is described in more detail in conjunction with FIG. 14.

The I/O unit 1002 is configured to transmit and receive communications (e.g., commands, data, etc.) from a host processor (not shown) over the interconnect 1016. The I/O unit 1002 may communicate with the host processor directly via the interconnect 1016 or through one or more intermediate devices such as a memory bridge. In an embodiment, the I/O unit 1002 may communicate with one or more other processors, such as one or more parallel processing unit 1000 modules via the interconnect 1016. In an embodiment, the I/O unit 1002 implements a Peripheral Component Interconnect Express (PCIe) interface for communications over a PCIe bus and the interconnect 1016 is a PCIe bus. In alternative embodiments, the I/O unit 1002 may implement other types of well-known interfaces for communicating with external devices.

The I/O unit 1002 decodes packets received via the interconnect 1016. In an embodiment, the packets represent commands configured to cause the parallel processing unit 1000 to perform various operations. The I/O unit 1002 transmits the decoded commands to various other units of the parallel processing unit 1000 as the commands may specify. For example, some commands may be transmitted to the front-end unit 1004. Other commands may be transmitted to the hub 1010 or other units of the parallel processing unit 1000 such as one or more copy engines, a video encoder, a video decoder, a power management unit, etc. (not explicitly shown). In other words, the I/O unit 1002 is configured to route communications between and among the various logical units of the parallel processing unit 1000.

In an embodiment, a program executed by the host processor encodes a command stream in a buffer that provides workloads to the parallel processing unit 1000 for processing. A workload may comprise several instructions and data to be processed by those instructions. The buffer is a region in a memory that is accessible (e.g., read/write) by both the host processor and the parallel processing unit 1000. For example, the I/O unit 1002 may be configured to access the buffer in a system memory connected to the interconnect 1016 via memory requests transmitted over the interconnect 1016. In an embodiment, the host processor writes the command stream to the buffer and then transmits a pointer to the start of the command stream to the parallel processing unit 1000. The front-end unit 1004 receives pointers to one or more command streams. The front-end unit 1004 manages the one or more streams, reading commands from the streams and forwarding commands to the various units of the parallel processing unit 1000.

The front-end unit 1004 is coupled to a scheduler unit 1006 that configures the various general processing cluster 1100 modules to process tasks defined by the one or more streams. The scheduler unit 1006 is configured to track state information related to the various tasks managed by the scheduler unit 1006. The state may indicate which general processing cluster 1100 a task is assigned to, whether the task is active or inactive, a priority level associated with the task, and so forth. The scheduler unit 1006 manages the execution of a plurality of tasks on the one or more general processing cluster 1100 modules.

The scheduler unit 1006 is coupled to a work distribution unit 1008 that is configured to dispatch tasks for execution on the general processing cluster 1100 modules. The work distribution unit 1008 may track a number of scheduled tasks received from the scheduler unit 1006. In an embodiment, the work distribution unit 1008 manages a pending task pool and an active task pool for each of the general processing cluster 1100 modules. The pending task pool may comprise a number of slots (e.g., 32 slots) that contain tasks assigned to be processed by a particular general processing cluster 1100. The active task pool may comprise a number of slots (e.g., 4 slots) for tasks that are actively being processed by the general processing cluster 1100 modules. As a general processing cluster 1100 finishes the execution of a task, that task is evicted from the active task pool for the general processing cluster 1100 and one of the other tasks from the pending task pool is selected and scheduled for execution on the general processing cluster 1100. If an active task has been idle on the general processing cluster 1100, such as while waiting for a data dependency to be resolved, then the active task may be evicted from the general processing cluster 1100 and returned to the pending task pool while another task in the pending task pool is selected and scheduled for execution on the general processing cluster 1100.

The work distribution unit 1008 communicates with the one or more general processing cluster 1100 modules via crossbar 1012. The crossbar 1012 is an interconnect network that couples many of the units of the parallel processing unit 1000 to other units of the parallel processing unit 1000. For example, the crossbar 1012 may be configured to couple the work distribution unit 1008 to a particular general processing cluster 1100. Although not shown explicitly, one or more other units of the parallel processing unit 1000 may also be connected to the crossbar 1012 via the hub 1010.

The tasks are managed by the scheduler unit 1006 and dispatched to a general processing cluster 1100 by the work distribution unit 1008. The general processing cluster 1100 is configured to process the task and generate results. The results may be consumed by other tasks within the general processing cluster 1100, routed to a different general processing cluster 1100 via the crossbar 1012, or stored in the memory 1018. The results can be written to the memory 1018 via the memory partition unit 1200 modules, which implement a memory interface for reading and writing data to/from the memory 1018. The results can be transmitted to another parallel processing unit 1000 or CPU via the NVLink 1014. In an embodiment, the parallel processing unit 1000 includes a number U of memory partition unit 1200 modules that is equal to the number of separate and distinct memory 1018 devices coupled to the parallel processing unit 1000. A memory partition unit 1200 will be described in more detail below in conjunction with FIG. 12.

In an embodiment, a host processor executes a driver kernel that implements an application programming interface (API) that enables one or more applications executing on the host processor to schedule operations for execution on the parallel processing unit 1000. In an embodiment, multiple compute applications are simultaneously executed by the parallel processing unit 1000 and the parallel processing unit 1000 provides isolation, quality of service (QoS), and independent address spaces for the multiple compute applications. An application may generate instructions (e.g., API calls) that cause the driver kernel to generate one or more tasks for execution by the parallel processing unit 1000. The driver kernel outputs tasks to one or more streams being processed by the parallel processing unit 1000. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 13.

Figure 11:
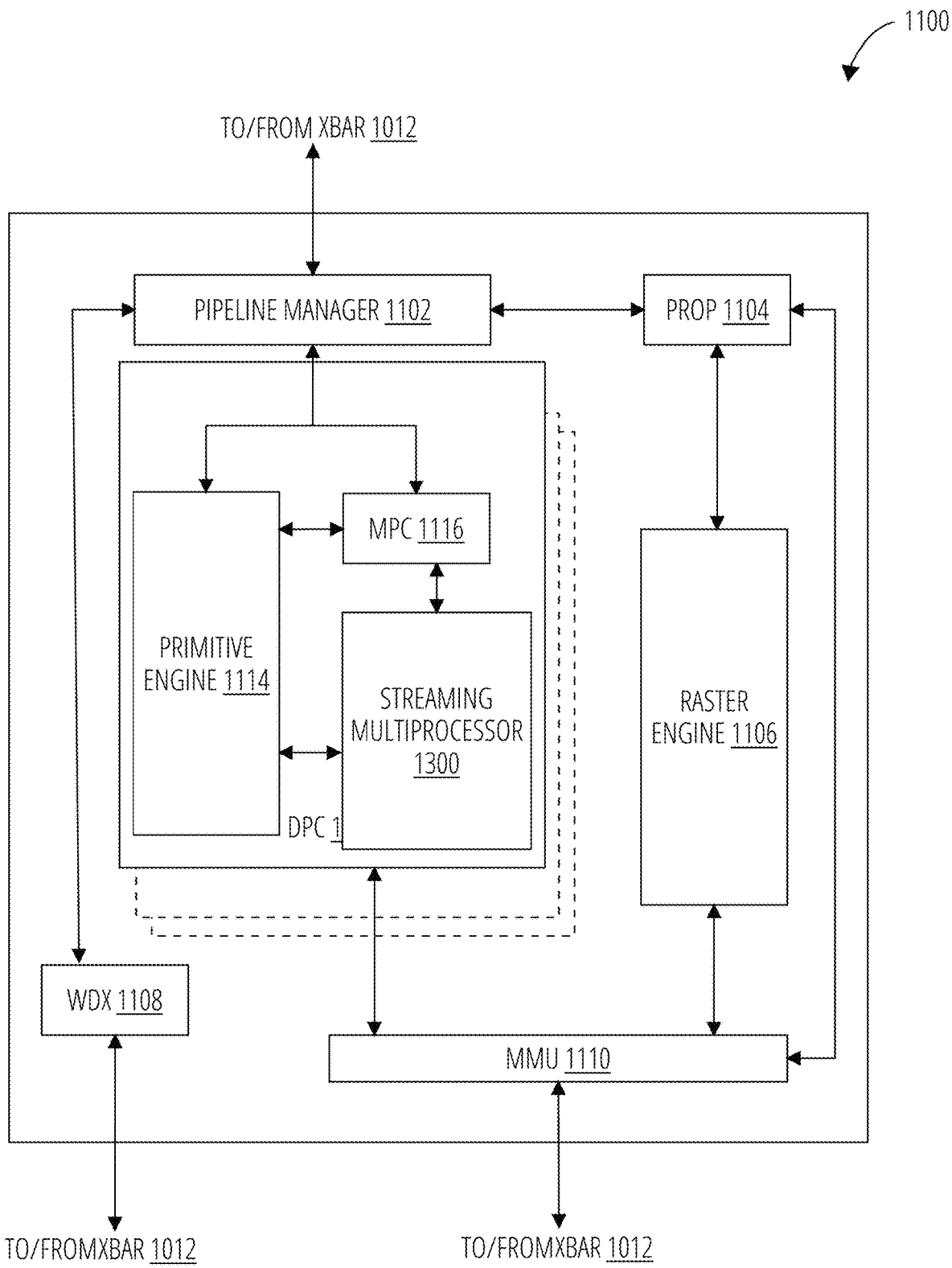
FIG. 11 depicts a general processing cluster 1100 in accordance with one embodiment.

FIG. 11 depicts a general processing cluster 1100 of the parallel processing unit 1000 of FIG. 10, in accordance with an embodiment. As shown in FIG. 11, each general processing cluster 1100 includes a number of hardware units for processing tasks. In an embodiment, each general processing cluster 1100 includes a pipeline manager 1102, a pre-raster operations unit 1104, a raster engine 1106, a work distribution crossbar 1108, a memory management unit 1110, and one or more data processing cluster 1112. It may be appreciated that the general processing cluster 1100 of FIG. 11 may include other hardware units in lieu of or in addition to the units shown in FIG. 11.

In an embodiment, the operation of the general processing cluster 1100 is controlled by the pipeline manager 1102. The pipeline manager 1102 manages the configuration of the one or more data processing cluster 1112 modules for processing tasks allocated to the general processing cluster 1100. In an embodiment, the pipeline manager 1102 may configure at least one of the one or more data processing cluster 1112 modules to implement at least a portion of a graphics rendering pipeline. For example, a data processing cluster 1112 may be configured to execute a vertex shader program on the programmable streaming multiprocessor 1300. The pipeline manager 1102 may also be configured to route packets received from the work distribution unit 1008 to the appropriate logical units within the general processing cluster 1100. For example, some packets may be routed to fixed function hardware units in the pre-raster operations unit 1104 and/or raster engine 1106 while other packets may be routed to the data processing cluster 1112 modules for processing by the primitive engine 1114 or the streaming multiprocessor 1300. In an embodiment, the pipeline manager 1102 may configure at least one of the one or more data processing cluster 1112 modules to implement a neural network model and/or a computing pipeline.

Figure 12:
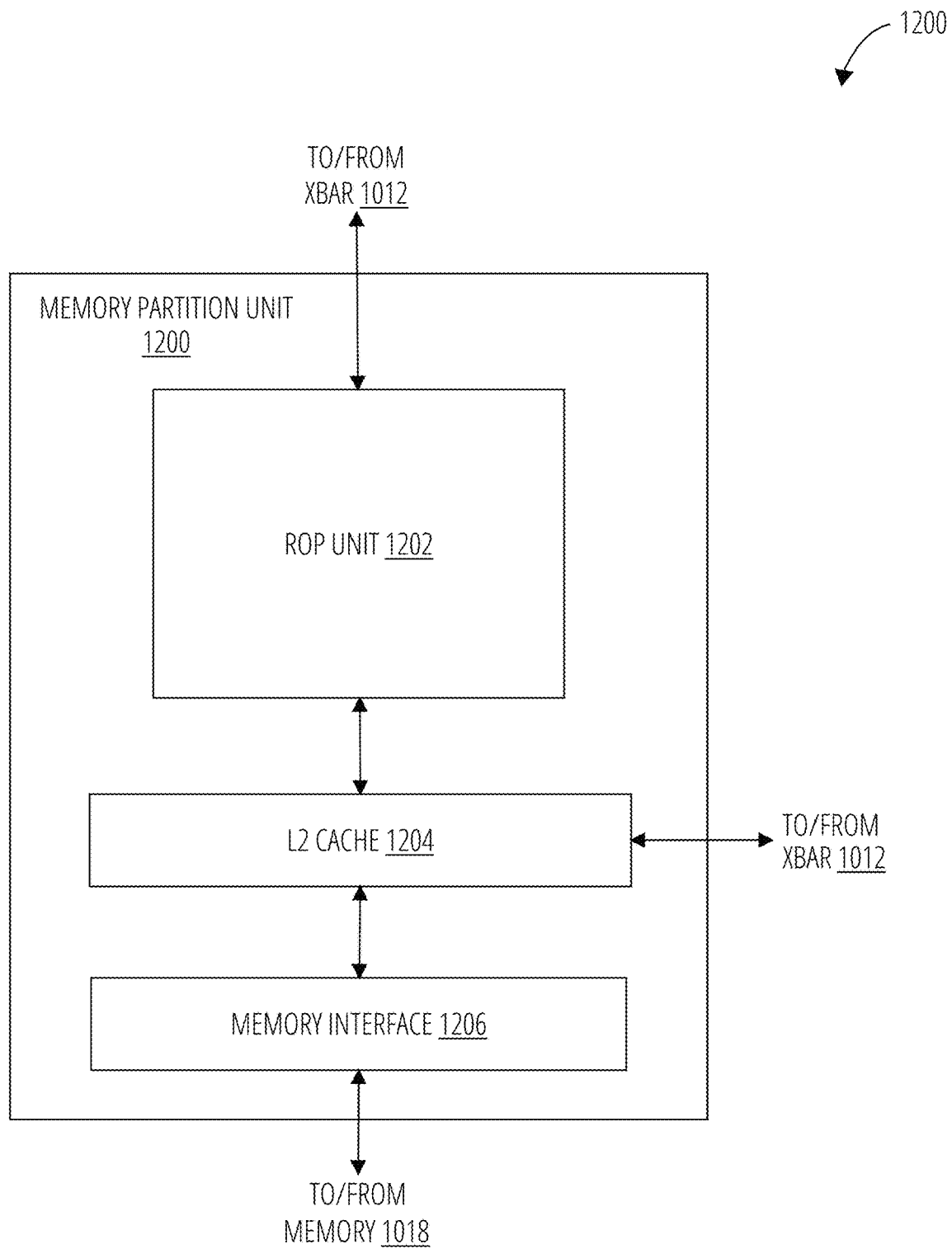
FIG. 12 depicts a memory partition unit 1200 in accordance with one embodiment.

The pre-raster operations unit 1104 is configured to route data generated by the raster engine 1106 and the data processing cluster 1112 modules to a Raster Operations (ROP) unit, described in more detail in conjunction with FIG. 12. The pre-raster operations unit 1104 may also be configured to perform optimizations for color blending, organize pixel data, perform address translations, and the like.

The raster engine 1106 includes a number of fixed function hardware units configured to perform various raster operations. In an embodiment, the raster engine 1106 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1106 comprises fragments to be processed, for example, by a fragment shader implemented within a data processing cluster 1112.

Each data processing cluster 1112 included in the general processing cluster 1100 includes an M-pipe controller 1116, a primitive engine 1114, and one or more streaming multiprocessor 1300 modules. The M-pipe controller 1116 controls the operation of the data processing cluster 1112, routing packets received from the pipeline manager 1102 to the appropriate units in the data processing cluster 1112. For example, packets associated with a vertex may be routed to the primitive engine 1114, which is configured to fetch vertex attributes associated with the vertex from the memory 1018. In contrast, packets associated with a shader program may be transmitted to the streaming multiprocessor 1300.

The streaming multiprocessor 1300 comprises a programmable streaming processor that is configured to process tasks represented by a number of threads. Each streaming multiprocessor 1300 is multi-threaded and configured to execute a plurality of threads (e.g., 32 threads) from a particular group of threads concurrently. In an embodiment, the streaming multiprocessor 1300 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1300 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1300 will be described in more detail below in conjunction with FIG. 13.

The memory management unit 1110 provides an interface between the general processing cluster 1100 and the memory partition unit 1200. The memory management unit 1110 may provide translation of virtual addresses into physical addresses, memory protection, and arbitration of memory requests. In an embodiment, the memory management unit 1110 provides one or more translation lookaside buffers (TLBs) for performing translation of virtual addresses into physical addresses in the memory 1018.

FIG. 12 depicts a memory partition unit 1200 of the parallel processing unit 1000 of FIG. 10, in accordance with an embodiment. As shown in FIG. 12, the memory partition unit 1200 includes a raster operations unit 1202, a level two cache 1204, and a memory interface 1206. The memory interface 1206 is coupled to the memory 1018. Memory interface 1206 may implement 32, 64, 128, 1024-bit data buses, or the like, for high-speed data transfer. In an embodiment, the parallel processing unit 1000 incorporates U memory interface 1206 modules, one memory interface 1206 per pair of memory partition unit 1200 modules, where each pair of memory partition unit 1200 modules is connected to a corresponding memory 1018 device. For example, parallel processing unit 1000 may be connected to up to Y memory 1018 devices, such as high bandwidth memory stacks or graphics double-data-rate, version 5, synchronous dynamic random access memory, or other types of persistent storage.

In an embodiment, the memory interface 1206 implements an HBM2 memory interface and Y equals half U. In an embodiment, the HBM2 memory stacks are located on the same physical package as the parallel processing unit 1000, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1018 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1000 modules process very large datasets and/or run applications for extended periods.

In an embodiment, the parallel processing unit 1000 implements a multi-level memory hierarchy. In an embodiment, the memory partition unit 1200 supports a unified memory to provide a single unified virtual address space for CPU and parallel processing unit 1000 memory, enabling data sharing between virtual memory systems. In an embodiment the frequency of accesses by a parallel processing unit 1000 to memory located on other processors is traced to ensure that memory pages are moved to the physical memory of the parallel processing unit 1000 that is accessing the pages more frequently. In an embodiment, the NVLink 1014 supports address translation services allowing the parallel processing unit 1000 to directly access a CPU's page tables and providing full access to CPU memory by the parallel processing unit 1000.

In an embodiment, copy engines transfer data between multiple parallel processing unit 1000 modules or between parallel processing unit 1000 modules and CPUs. The copy engines can generate page faults for addresses that are not mapped into the page tables. The memory partition unit 1200 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1018 or other system memory may be fetched by the memory partition unit 1200 and stored in the level two cache 1204, which is located on-chip and is shared between the various general processing cluster 1100 modules. As shown, each memory partition unit 1200 includes a portion of the level two cache 1204 associated with a corresponding memory 1018 device. Lower level caches may then be implemented in various units within the general processing cluster 1100 modules. For example, each of the streaming multiprocessor 1300 modules may implement an L1 cache. The L1 cache is private memory that is dedicated to a particular streaming multiprocessor 1300. Data from the level two cache 1204 may be fetched and stored in each of the L1 caches for processing in the functional units of the streaming multiprocessor 1300 modules. The level two cache 1204 is coupled to the memory interface 1206 and the crossbar 1012.

The raster operations unit 1202 performs graphics raster operations related to pixel color, such as color compression, pixel blending, and the like. The raster operations unit 1202 also implements depth testing in conjunction with the raster engine 1106, receiving a depth for a sample location associated with a pixel fragment from the culling engine of the raster engine 1106. The depth is tested against a corresponding depth in a depth buffer for a sample location associated with the fragment. If the fragment passes the depth test for the sample location, then the raster operations unit 1202 updates the depth buffer and transmits a result of the depth test to the raster engine 1106. It will be appreciated that the number of partition memory partition unit 1200 modules may be different than the number of general processing cluster 1100 modules and, therefore, each raster operations unit 1202 may be coupled to each of the general processing cluster 1100 modules. The raster operations unit 1202 tracks packets received from the different general processing cluster 1100 modules and determines which general processing cluster 1100 that a result generated by the raster operations unit 1202 is routed to through the crossbar 1012. Although the raster operations unit 1202 is included within the memory partition unit 1200 in FIG. 12, in other embodiment, the raster operations unit 1202 may be outside of the memory partition unit 1200. For example, the raster operations unit 1202 may reside in the general processing cluster 1100 or another unit.

Figure 13:
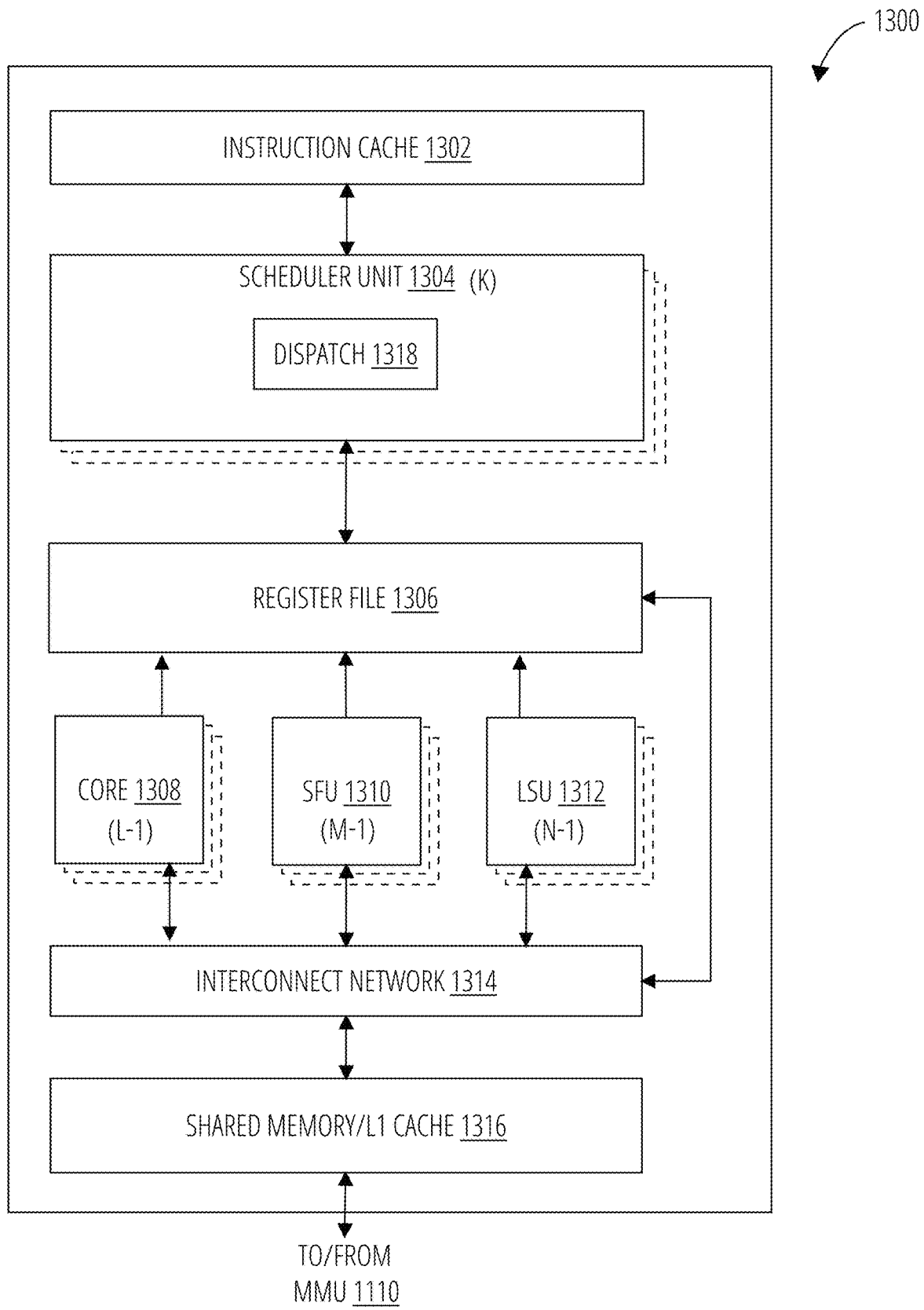
FIG. 13 depicts a streaming multiprocessor 1300 in accordance with one embodiment.

FIG. 13 illustrates the streaming multiprocessor 1300 of FIG. 11, in accordance with an embodiment. As shown in FIG. 13, the streaming multiprocessor 1300 includes an instruction cache 1302, one or more scheduler unit 1304 modules (e.g., such as scheduler unit 1006), a register file 1306, one or more processing core 1308 modules, one or more special function unit 1310 modules, one or more load/store unit 1312 modules, an interconnect network 1314, and a shared memory/L1 cache 1316.

As described above, the work distribution unit 1008 dispatches tasks for execution on the general processing cluster 1100 modules of the parallel processing unit 1000. The tasks are allocated to a particular data processing cluster 1112 within a general processing cluster 1100 and, if the task is associated with a shader program, the task may be allocated to a streaming multiprocessor 1300. The scheduler unit 1006 receives the tasks from the work distribution unit 1008 and manages instruction scheduling for one or more thread blocks assigned to the streaming multiprocessor 1300. The scheduler unit 1304 schedules thread blocks for execution as warps of parallel threads, where each thread block is allocated at least one warp. In an embodiment, each warp executes 32 threads. The scheduler unit 1304 may manage a plurality of different thread blocks, allocating the warps to the different thread blocks and then dispatching instructions from the plurality of different cooperative groups to the various functional units (e.g., core 1308 modules, special function unit 1310 modules, and load/store unit 1312 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1318 unit is configured within the scheduler unit 1304 to transmit instructions to one or more of the functional units. In one embodiment, the scheduler unit 1304 includes two dispatch 1318 units that enable two different instructions from the same warp to be dispatched during each clock cycle. In alternative embodiments, each scheduler unit 1304 may include a single dispatch 1318 unit or additional dispatch 1318 units.

Each streaming multiprocessor 1300 includes a register file 1306 that provides a set of registers for the functional units of the streaming multiprocessor 1300. In an embodiment, the register file 1306 is divided between each of the functional units such that each functional unit is allocated a dedicated portion of the register file 1306. In another embodiment, the register file 1306 is divided between the different warps being executed by the streaming multiprocessor 1300. The register file 1306 provides temporary storage for operands connected to the data paths of the functional units.

Each streaming multiprocessor 1300 comprises L processing core 1308 modules. In an embodiment, the streaming multiprocessor 1300 includes a large number (e.g., 128, etc.) of distinct processing core 1308 modules. Each core 1308 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1308 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1308 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1300 also comprises M special function unit 1310 modules that perform special functions (e.g., attribute evaluation, reciprocal square root, and the like). In an embodiment, the special function unit 1310 modules may include a tree traversal unit configured to traverse a hierarchical tree data structure. In an embodiment, the special function unit 1310 modules may include texture unit configured to perform texture map filtering operations. In an embodiment, the texture units are configured to load texture maps (e.g., a 2D array of texels) from the memory 1018 and sample the texture maps to produce sampled texture values for use in shader programs executed by the streaming multiprocessor 1300. In an embodiment, the texture maps are stored in the shared memory/L1 cache 1316. The texture units implement texture operations such as filtering operations using mip-maps (e.g., texture maps of varying levels of detail). In an embodiment, each streaming multiprocessor 1300 includes two texture units.

Each streaming multiprocessor 1300 also comprises N load/store unit 1312 modules that implement load and store operations between the shared memory/L1 cache 1316 and the register file 1306. Each streaming multiprocessor 1300 includes an interconnect network 1314 that connects each of the functional units to the register file 1306 and the load/store unit 1312 to the register file 1306 and shared memory/L1 cache 1316. In an embodiment, the interconnect network 1314 is a crossbar that can be configured to connect any of the functional units to any of the registers in the register file 1306 and connect the load/store unit 1312 modules to the register file 1306 and memory locations in shared memory/L1 cache 1316.

The shared memory/L1 cache 1316 is an array of on-chip memory that allows for data storage and communication between the streaming multiprocessor 1300 and the primitive engine 1114 and between threads in the streaming multiprocessor 1300. In an embodiment, the shared memory/L1 cache 1316 comprises 128 KB of storage capacity and is in the path from the streaming multiprocessor 1300 to the memory partition unit 1200. The shared memory/L1 cache 1316 can be used to cache reads and writes. One or more of the shared memory/L1 cache 1316, level two cache 1204, and memory 1018 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1316 enables the shared memory/L1 cache 1316 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 10, are bypassed, creating a much simpler programming model. In the general purpose parallel computation configuration, the work distribution unit 1008 assigns and distributes blocks of threads directly to the data processing cluster 1112 modules. The threads in a block execute the same program, using a unique thread ID in the calculation to ensure each thread generates unique results, using the streaming multiprocessor 1300 to execute the program and perform calculations, shared memory/L1 cache 1316 to communicate between threads, and the load/store unit 1312 to read and write global memory through the shared memory/L1 cache 1316 and the memory partition unit 1200. When configured for general purpose parallel computation, the streaming multiprocessor 1300 can also write commands that the scheduler unit 1006 can use to launch new work on the data processing cluster 1112 modules.

The parallel processing unit 1000 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1000 is embodied on a single semiconductor substrate. In another embodiment, the parallel processing unit 1000 is included in a system-on-a-chip (SoC) along with one or more other devices such as additional parallel processing unit 1000 modules, the memory 1018, a reduced instruction set computer (RISC) CPU, a memory management unit (MMU), a digital-to-analog converter (DAC), and the like.

In an embodiment, the parallel processing unit 1000 may be included on a graphics card that includes one or more memory devices. The graphics card may be configured to interface with a PCIe slot on a motherboard of a desktop computer. In yet another embodiment, the parallel processing unit 1000 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 14:
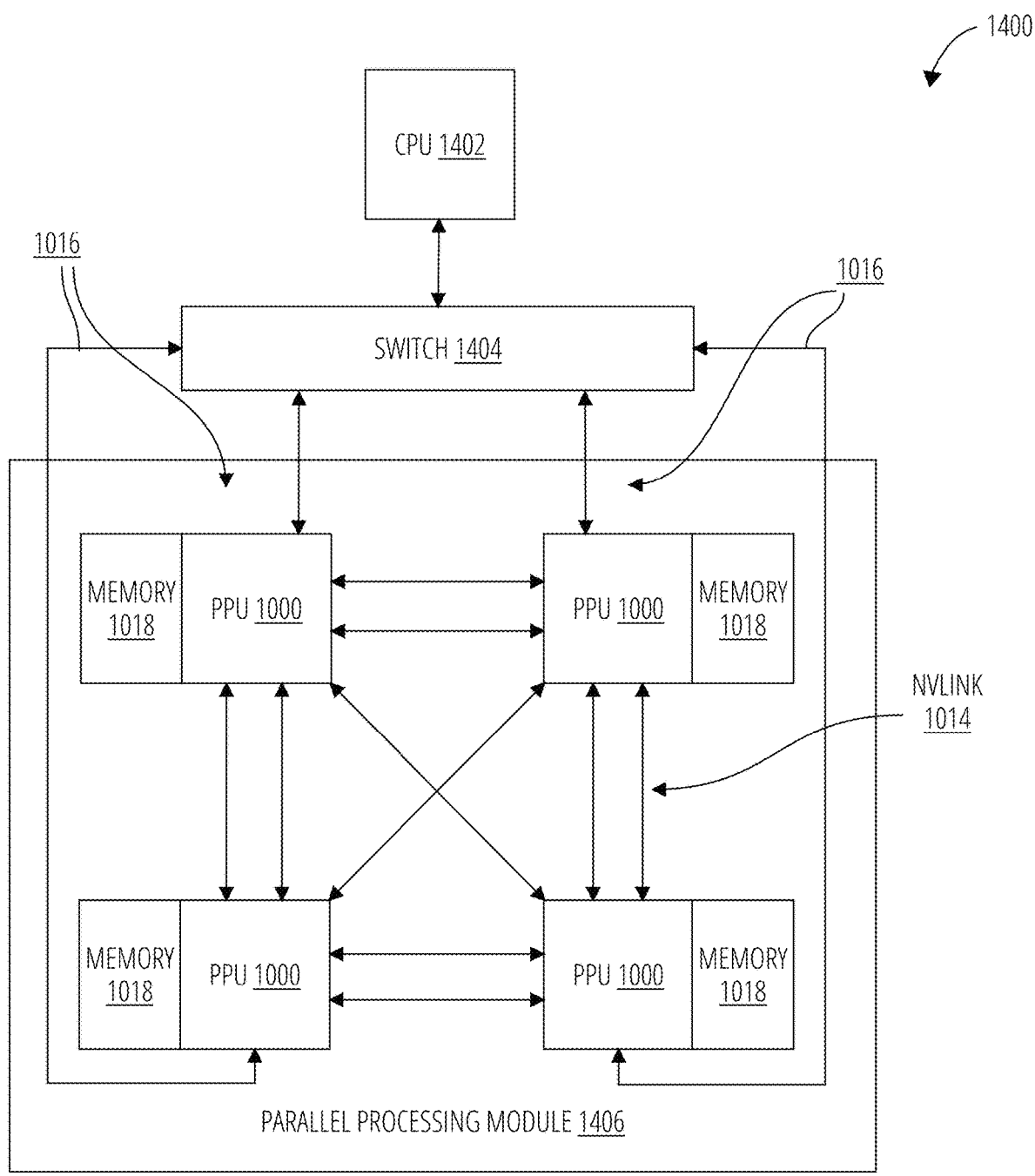
FIG. 14 depicts a processing system 1400 in accordance with one embodiment.

FIG. 14 is a conceptual diagram of a processing system 1400 implemented using the parallel processing unit 1000 of FIG. 10, in accordance with an embodiment. The processing system 1400 includes a central processing unit 1402, switch 1404, and multiple parallel processing unit 1000 modules each and respective memory 1018 modules. The NVLink 1014 provides high-speed communication links between each of the parallel processing unit 1000 modules. Although a particular number of NVLink 1014 and interconnect 1016 connections are illustrated in FIG. 14, the number of connections to each parallel processing unit 1000 and the central processing unit 1402 may vary. The switch 1404 interfaces between the interconnect 1016 and the central processing unit 1402. The parallel processing unit 1000 modules, memory 1018 modules, and NVLink 1014 connections may be situated on a single semiconductor platform to form a parallel processing module 1406. In an embodiment, the switch 1404 supports two or more protocols to interface between various different connections and/or links.

In another embodiment (not shown), the NVLink 1014 provides one or more high-speed communication links between each of the parallel processing unit 1000 modules and the central processing unit 1402 and the switch 1404 interfaces between the interconnect 1016 and each of the parallel processing unit 1000 modules. The parallel processing unit 1000 modules, memory 1018 modules, and interconnect 1016 may be situated on a single semiconductor platform to form a parallel processing module 1406. In yet another embodiment (not shown), the interconnect 1016 provides one or more communication links between each of the parallel processing unit 1000 modules and the central processing unit 1402 and the switch 1404 interfaces between each of the parallel processing unit 1000 modules using the NVLink 1014 to provide one or more high-speed communication links between the parallel processing unit 1000 modules. In another embodiment (not shown), the NVLink 1014 provides one or more high-speed communication links between the parallel processing unit 1000 modules and the central processing unit 1402 through the switch 1404. In yet another embodiment (not shown), the interconnect 1016 provides one or more communication links between each of the parallel processing unit 1000 modules directly. One or more of the NVLink 1014 high-speed communication links may be implemented as a physical NVLink interconnect or either an on-chip or on-die interconnect using the same protocol as the NVLink 1014.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1406 may be implemented as a circuit board substrate and each of the parallel processing unit 1000 modules and/or memory 1018 modules may be packaged devices. In an embodiment, the central processing unit 1402, switch 1404, and the parallel processing module 1406 are situated on a single semiconductor platform.

In an embodiment, the signaling rate of each NVLink 1014 is 20 to 25 Gigabits/second and each parallel processing unit 1000 includes six NVLink 1014 interfaces (as shown in FIG. 14, five NVLink 1014 interfaces are included for each parallel processing unit 1000). Each NVLink 1014 provides a data transfer rate of 25 Gigabytes/second in each direction, with six links providing 300 Gigabytes/second. The NVLink 1014 can be used exclusively for PPU-to-PPU communication as shown in FIG. 14, or some combination of PPU-to-PPU and PPU-to-CPU, when the central processing unit 1402 also includes one or more NVLink 1014 interfaces.

In an embodiment, the NVLink 1014 allows direct load/store/atomic access from the central processing unit 1402 to each parallel processing unit 1000 module's memory 1018. In an embodiment, the NVLink 1014 supports coherency operations, allowing data read from the memory 1018 modules to be stored in the cache hierarchy of the central processing unit 1402, reducing cache access latency for the central processing unit 1402. In an embodiment, the NVLink 1014 includes support for Address Translation Services (ATS), allowing the parallel processing unit 1000 to directly access page tables within the central processing unit 1402. One or more of the NVLink 1014 may also be configured to operate in a low-power mode.

Figure 15:
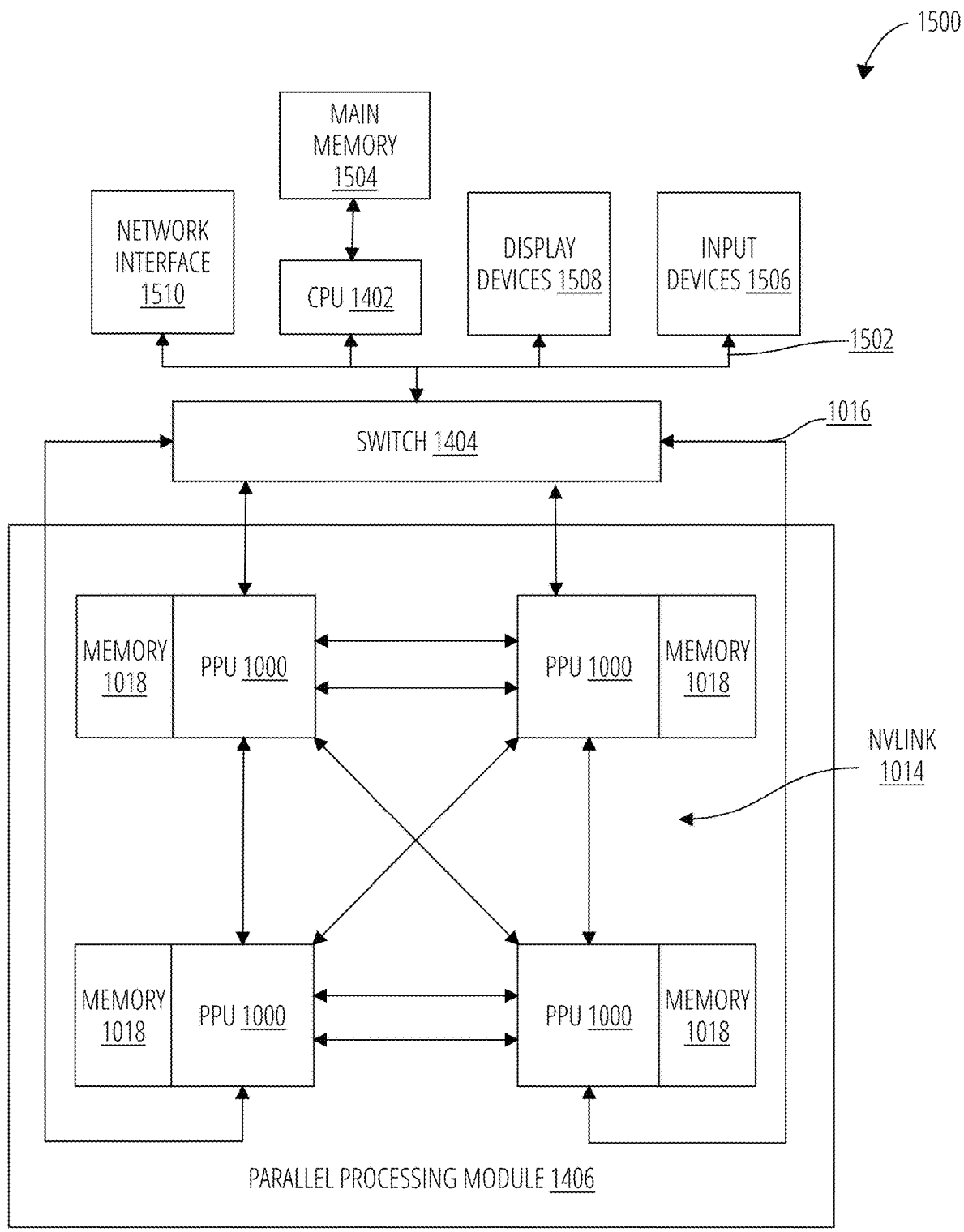
FIG. 15 depicts an exemplary processing system 1500 in accordance with another embodiment.

FIG. 15 depicts an exemplary processing system 1500 in which the various architecture and/or functionality of the various previous embodiments may be implemented. As shown, an exemplary processing system 1500 is provided including at least one central processing unit 1402 that is connected to a communications bus 1502. The communication communications bus 1502 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1500 also includes a main memory 1504. Control logic (software) and data are stored in the main memory 1504 which may take the form of random access memory (RAM).

The exemplary processing system 1500 also includes input devices 1506, the parallel processing module 1406, and display devices 1508, e.g. a conventional CRT (cathode ray tube), LCD (liquid crystal display), LED (light emitting diode), plasma display or the like. User input may be received from the input devices 1506, e.g., keyboard, mouse, touchpad, microphone, and the like. Each of the foregoing modules and/or devices may even be situated on a single semiconductor platform to form the exemplary processing system 1500. Alternately, the various modules may also be situated separately or in various combinations of semiconductor platforms per the desires of the user.

Further, the exemplary processing system 1500 may be coupled to a network (e.g., a telecommunications network, local area network (LAN), wireless network, wide area network (WAN) such as the Internet, peer-to-peer network, cable network, or the like) through a network interface 1510 for communication purposes.

The exemplary processing system 1500 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1504 and/or the secondary storage. Such computer programs, when executed, enable the exemplary processing system 1500 to perform various functions. The main memory 1504, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1500 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 16:
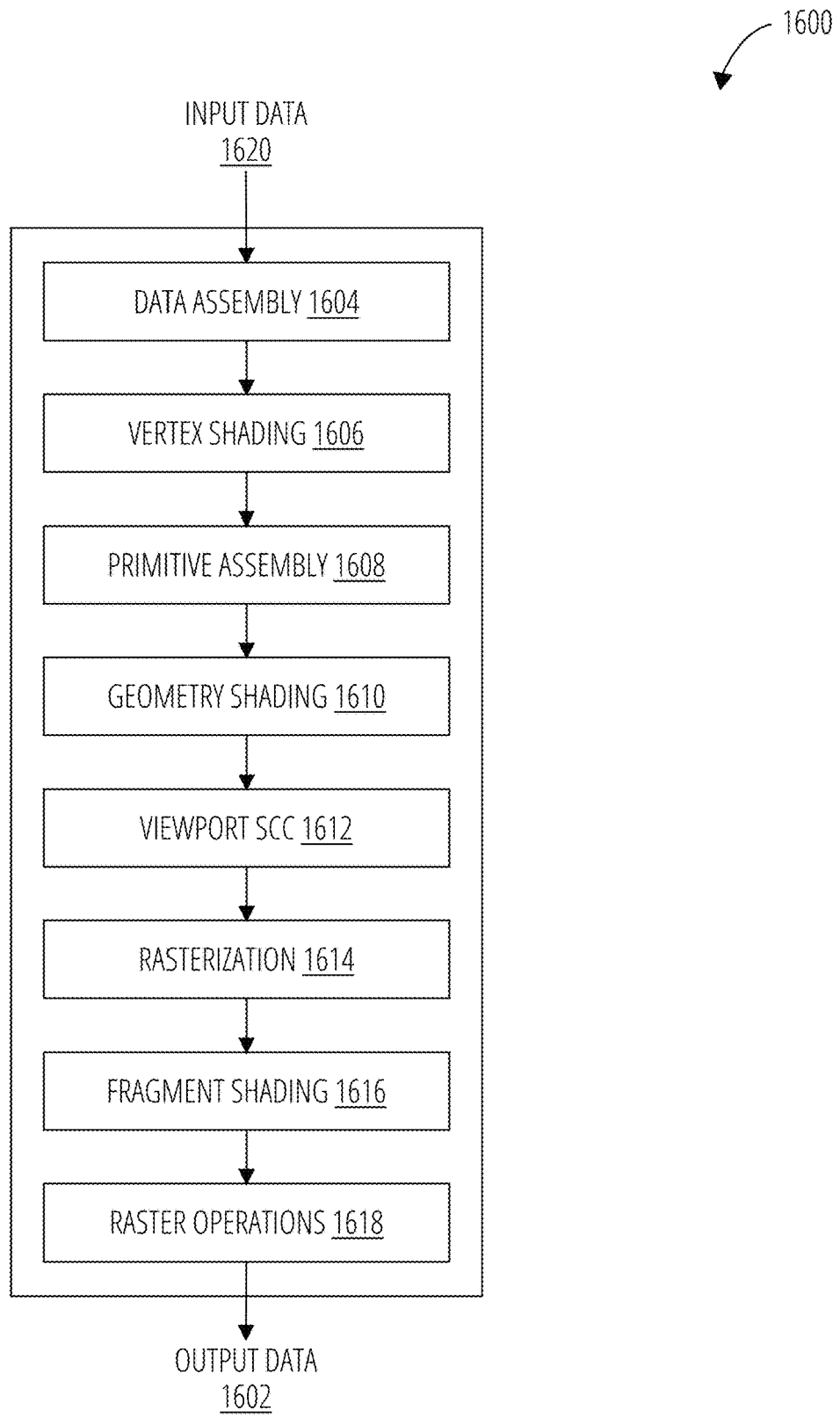
FIG. 16 depicts a graphics processing pipeline 1600 in accordance with one embodiment.

FIG. 16 is a conceptual diagram of a graphics processing pipeline 1600 implemented by the parallel processing unit 1000 of FIG. 10, in accordance with an embodiment. In an embodiment, the parallel processing unit 1000 comprises a graphics processing unit (GPU). The parallel processing unit 1000 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1000 can be configured to process the graphics primitives to generate a frame buffer (e.g., pixel data for each of the pixels of the display).

An application writes model data for a scene (e.g., a collection of vertices and attributes) to a memory such as a system memory or memory 1018. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1300 modules of the parallel processing unit 1000 including one or more of a vertex shader, hull shader, domain shader, geometry shader, and a pixel shader. For example, one or more of the streaming multiprocessor 1300 modules may be configured to execute a vertex shader program that processes a number of vertices defined by the model data. In an embodiment, the different streaming multiprocessor 1300 modules may be configured to execute different shader programs concurrently. For example, a first subset of streaming multiprocessor 1300 modules may be configured to execute a vertex shader program while a second subset of streaming multiprocessor 1300 modules may be configured to execute a pixel shader program. The first subset of streaming multiprocessor 1300 modules processes vertex data to produce processed vertex data and writes the processed vertex data to the level two cache 1204 and/or the memory 1018. After the processed vertex data is rasterized (e.g., transformed from three-dimensional data into two-dimensional data in screen space) to produce fragment data, the second subset of streaming multiprocessor 1300 modules executes a pixel shader to produce processed fragment data, which is then blended with other processed fragment data and written to the frame buffer in memory 1018. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1600 is an abstract flow diagram of the processing steps implemented to generate 2D computer-generated images from 3D geometry data. Pipeline architectures may perform long latency operations more efficiently by splitting up the operation into a plurality of stages, where the output of each stage is coupled to the input of the next successive stage. Thus, the graphics processing pipeline 1600 receives input data 601 that is transmitted from one stage to the next stage of the graphics processing pipeline 1600 to generate output data 1602. In an embodiment, the graphics processing pipeline 1600 may represent a graphics processing pipeline defined by the OpenGL® API. As an option, the graphics processing pipeline 1600 may be implemented in the context of the functionality and architecture of the previous Figures and/or any subsequent Figure(s).

As shown in FIG. 16, the graphics processing pipeline 1600 comprises a pipeline architecture that includes a number of stages. The stages include, but are not limited to, a data assembly 1604 stage, a vertex shading 1606 stage, a primitive assembly 1608 stage, a geometry shading 1610 stage, a viewport SCC 1612 stage, a rasterization 1614 stage, a fragment shading 1616 stage, and a raster operations 1618 stage. In an embodiment, the input data 1620 comprises commands that configure the processing units to implement the stages of the graphics processing pipeline 1600 and geometric primitives (e.g., points, lines, triangles, quads, triangle strips or fans, etc.) to be processed by the stages. The output data 1602 may comprise pixel data (e.g., color data) that is copied into a frame buffer or other type of surface data structure in a memory.

The data assembly 1604 stage receives the input data 1620 that specifies vertex data for high-order surfaces, primitives, or the like. The data assembly 1604 stage collects the vertex data in a temporary storage or queue, such as by receiving a command from the host processor that includes a pointer to a buffer in memory and reading the vertex data from the buffer. The vertex data is then transmitted to the vertex shading 1606 stage for processing.

The vertex shading 1606 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1606 stage may manipulate individual vertex attributes such as position, color, texture coordinates, and the like. In other words, the vertex shading 1606 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1606 stage generates transformed vertex data that is transmitted to the primitive assembly 1608 stage.

The primitive assembly 1608 stage collects vertices output by the vertex shading 1606 stage and groups the vertices into geometric primitives for processing by the geometry shading 1610 stage. For example, the primitive assembly 1608 stage may be configured to group every three consecutive vertices as a geometric primitive (e.g., a triangle) for transmission to the geometry shading 1610 stage. In some embodiments, specific vertices may be reused for consecutive geometric primitives (e.g., two consecutive triangles in a triangle strip may share two vertices). The primitive assembly 1608 stage transmits geometric primitives (e.g., a collection of associated vertices) to the geometry shading 1610 stage.

The geometry shading 1610 stage processes geometric primitives by performing a set of operations (e.g., a geometry shader or program) on the geometric primitives. Tessellation operations may generate one or more geometric primitives from each geometric primitive. In other words, the geometry shading 1610 stage may subdivide each geometric primitive into a finer mesh of two or more geometric primitives for processing by the rest of the graphics processing pipeline 1600. The geometry shading 1610 stage transmits geometric primitives to the viewport SCC 1612 stage.

In an embodiment, the graphics processing pipeline 1600 may operate within a streaming multiprocessor and the vertex shading 1606 stage, the primitive assembly 1608 stage, the geometry shading 1610 stage, the fragment shading 1616 stage, and/or hardware/software associated therewith, may sequentially perform processing operations. Once the sequential processing operations are complete, in an embodiment, the viewport SCC 1612 stage may utilize the data. In an embodiment, primitive data processed by one or more of the stages in the graphics processing pipeline 1600 may be written to a cache (e.g. L1 cache, a vertex cache, etc.). In this case, in an embodiment, the viewport SCC 1612 stage may access the data in the cache. In an embodiment, the viewport SCC 1612 stage and the rasterization 1614 stage are implemented as fixed function circuitry.

The viewport SCC 1612 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1614 stage.

The rasterization 1614 stage converts the 3D geometric primitives into 2D fragments (e.g. capable of being utilized for display, etc.). The rasterization 1614 stage may be configured to utilize the vertices of the geometric primitives to setup a set of plane equations from which various attributes can be interpolated. The rasterization 1614 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1614 stage generates fragment data (e.g., interpolated vertex attributes associated with a particular sample location for each covered pixel) that are transmitted to the fragment shading 1616 stage.

The fragment shading 1616 stage processes fragment data by performing a set of operations (e.g., a fragment shader or a program) on each of the fragments. The fragment shading 1616 stage may generate pixel data (e.g., color values) for the fragment such as by performing lighting operations or sampling texture maps using interpolated texture coordinates for the fragment. The fragment shading 1616 stage generates pixel data that is transmitted to the raster operations 1618 stage.

The raster operations 1618 stage may perform various operations on the pixel data such as performing alpha tests, stencil tests, and blending the pixel data with other pixel data corresponding to other fragments associated with the pixel. When the raster operations 1618 stage has finished processing the pixel data (e.g., the output data 1602), the pixel data may be written to a render target such as a frame buffer, a color buffer, or the like.

It will be appreciated that one or more additional stages may be included in the graphics processing pipeline 1600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1610 stage). Other types of graphics processing pipelines are contemplated as being within the scope of the present disclosure. Furthermore, any of the stages of the graphics processing pipeline 1600 may be implemented by one or more dedicated hardware units within a graphics processor such as parallel processing unit 1000. Other stages of the graphics processing pipeline 1600 may be implemented by programmable hardware units such as the streaming multiprocessor 1300 of the parallel processing unit 1000.

The graphics processing pipeline 1600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1000. The API provides an abstraction for a programmer that lets a programmer utilize specialized graphics hardware, such as the parallel processing unit 1000, to generate the graphical data without requiring the programmer to utilize the specific instruction set for the parallel processing unit 1000. The application may include an API call that is routed to the device driver for the parallel processing unit 1000. The device driver interprets the API call and performs various operations to respond to the API call. In some instances, the device driver may perform operations by executing instructions on the CPU. In other instances, the device driver may perform operations, at least in part, by launching operations on the parallel processing unit 1000 utilizing an input/output interface between the CPU and the parallel processing unit 1000. In an embodiment, the device driver is configured to implement the graphics processing pipeline 1600 utilizing the hardware of the parallel processing unit 1000.

Various programs may be executed within the parallel processing unit 1000 in order to implement the various stages of the graphics processing pipeline 1600. For example, the device driver may launch a kernel on the parallel processing unit 1000 to perform the vertex shading 1606 stage on one streaming multiprocessor 1300 (or multiple streaming multiprocessor 1300 modules). The device driver (or the initial kernel executed by the parallel processing unit 1000) may also launch other kernels on the parallel processing unit 1000 to perform other stages of the graphics processing pipeline 1600, such as the geometry shading 1610 stage and the fragment shading 1616 stage. In addition, some of the stages of the graphics processing pipeline 1600 may be implemented on fixed unit hardware such as a rasterizer or a data assembler implemented within the parallel processing unit 1000. It will be appreciated that results from one kernel may be processed by one or more intervening fixed function hardware units before being processed by a subsequent kernel on a streaming multiprocessor 1300.

Figure 17:
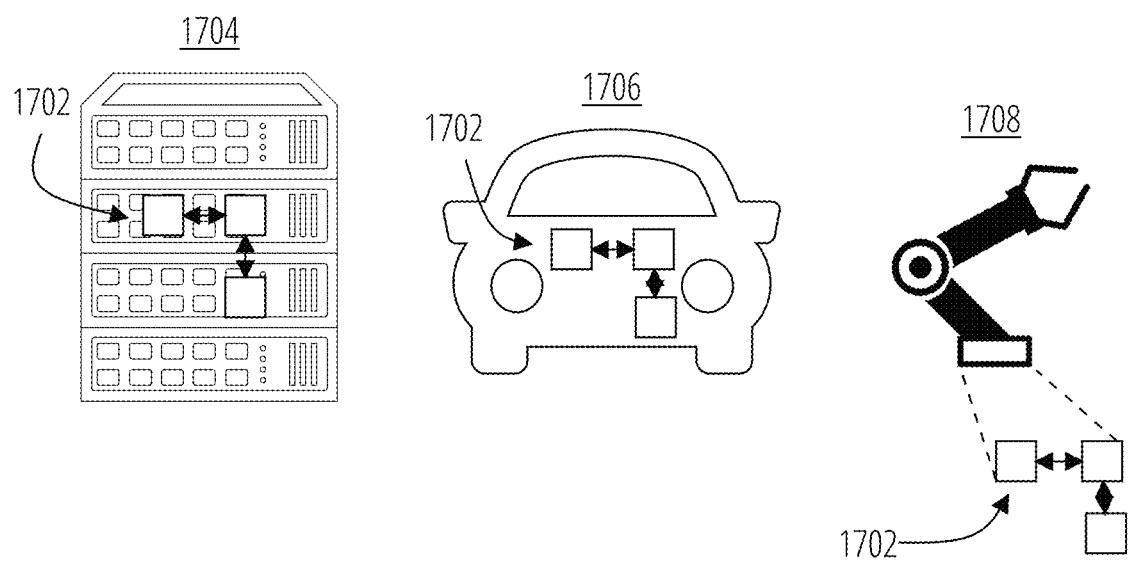
FIG. 17 depicts utilization of a parallel processing unit 1702 configured to carry out warp sharding in various environments.

FIG. 17 depicts exemplary scenarios for use of a parallel processing unit 1702 utilizing embodiments of the disclosed warp sharding logic and/or techniques. One or more of the parallel processing units 1702 may be utilized in a gaming system 1704, a vehicle 1706, and a robot 1708, to name just a few examples.

Figure 18:
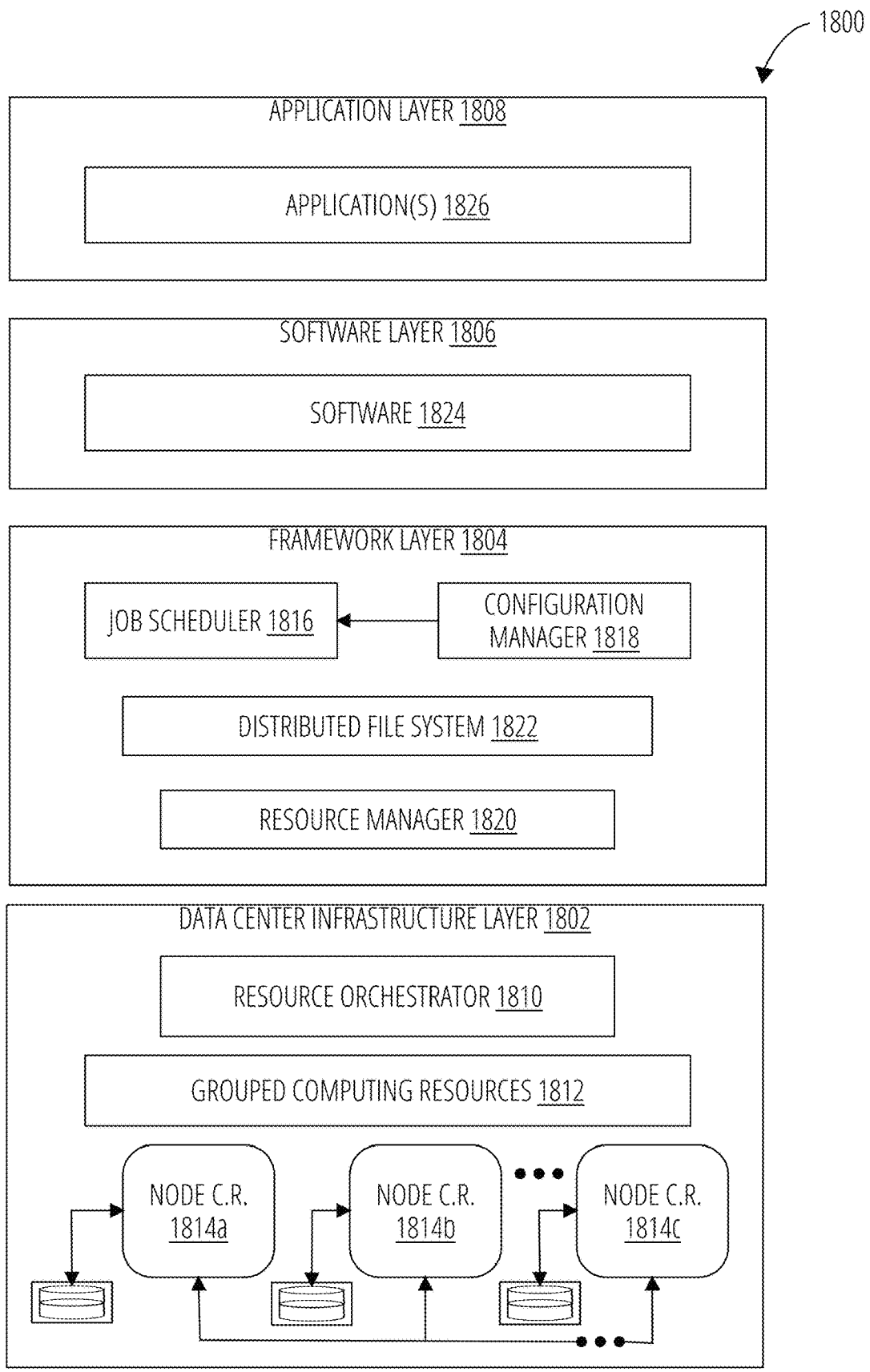
FIG. 18 depicts a data center 1800 configured to utilize warp sharding in accordance with one embodiment.

FIG. 18 depicts an exemplary data center 1800 in accordance with at least one embodiment. The data center 1800 may utilize embodiments of the warp sharding techniques logic and/or techniques herein, for example in high-performance computing systems executing applications prone to one or more of latency sensitivity, high thread divergence, or low warp occupancy. In at least one embodiment, data center 1800 includes, without limitation, a data center infrastructure layer 1802, a framework layer 1804, software layer 1806, and an application layer 1808.

In at least one embodiment, as depicted in FIG. 18, data center infrastructure layer 1802 may include a resource orchestrator 1810, grouped computing resources 1812, and node computing resources ("node C.R.s") Node C.R. 1814a, Node C.R. 1814b, Node C.R. 1814c, . . . node C.R. N), where "N" represents any whole, positive integer. In at least one embodiment, node C.R.s may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. One or more of the C.R.s may thus comprise logic in accordance with the warp sharding techniques described herein. In at least one embodiment, one or more node C.R.s from among node C.R.s may be a server having one or more of above-mentioned computing resources.

In at least one embodiment, grouped computing resources 1812 may include separate groupings of node C.R.s housed within one or more racks (not shown), or many racks housed in data centers at various geographical locations (also not shown). Separate groupings of node C.R.s within grouped computing resources 1812 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1810 may configure or otherwise control one or more node C.R.s and/or grouped computing resources 1812. In at least one embodiment, resource orchestrator 1810 may include a software design infrastructure ("SDI") management entity for data center 1800. In at least one embodiment, resource orchestrator 1810 may include hardware, software or some combination thereof.

In at least one embodiment, as depicted in FIG. 18, framework layer 1804 includes, without limitation, a job scheduler 1816, a configuration manager 1818, a resource manager 1820, and a distributed file system 1822. In at least one embodiment, framework layer 1804 may include a framework to support software 1824 of software layer 1806 and/or one or more application(s) 1826 of application layer 220. In at least one embodiment, software 1824 or application(s) 1826 may respectively include web-based service software or applications, such as those provided by Amazon Web Services, Google Cloud and Microsoft Azure. In at least one embodiment, framework layer 1804 may be, but is not limited to, a type of free and open-source software web application framework such as Apache Spark™ (hereinafter "Spark") that may utilize a distributed file system 1822 for large-scale data processing (e.g., "big data"). In at least one embodiment, job scheduler 1816 may include a Spark driver to facilitate scheduling of workloads supported by various layers of data center 1800. In at least one embodiment, configuration manager 1818 may be capable of configuring different layers such as software layer 1806 and framework layer 1804, including Spark and distributed file system 1822 for supporting large-scale data processing. In at least one embodiment, resource manager 1820 may be capable of managing clustered or grouped computing resources mapped to or allocated for support of distributed file system 1822 and distributed file system 1822. In at least one embodiment, clustered or grouped computing resources may include grouped computing resources 1812 at data center infrastructure layer 1802. In at least one embodiment, resource manager 1820 may coordinate with resource orchestrator 1810 to manage these mapped or allocated computing resources.

In at least one embodiment, software 1824 included in software layer 1806 may include software used by at least portions of node C.R.s, grouped computing resources 1812, and/or distributed file system 1822 of framework layer 1804. One or more types of software may include, but are not limited to, Internet web page search software, e-mail virus scan software, database software, and streaming video content software.

In at least one embodiment, application(s) 1826 included in application layer 1808 may include one or more types of applications used by at least portions of node C.R.s, grouped computing resources 1812, and/or distributed file system 1822 of framework layer 1804. In at least one or more types of applications may include, without limitation, CUDA applications, 5G network applications, artificial intelligence application, data center applications, and/or variations thereof.

In at least one embodiment, any of configuration manager 1818, resource manager 1820, and resource orchestrator 1810 may implement any number and type of self-modifying actions based on any amount and type of data acquired in any technically feasible fashion. In at least one embodiment, self-modifying actions may relieve a data center operator of data center 1800 from making possibly bad configuration decisions and possibly avoiding underutilized and/or poor performing portions of a data center.

LISTING OF DRAWING ELEMENTS 100 shard divergence
102 application code
104 warp
106 divergent threads
108 thread divergence
110 shard
112 shard
114 warp sharding
116 thread reconvergence
200 application with warp sharding
202 conventional warp sharding
204 first module
206 second module
208 improved warp sharding
210 divergent condition
212 reconvergence point
214 long-latency instruction
216 long-latency instruction
218 relinquish control
220 relinquish control
222 pipeline stall
224 pipeline stall
226 cooperative shard interleaving
300 application with warp sharding 302 module 1
304 module 2
306 module 3
308 divergent condition
310 reconvergence point
312 conventional SIMT execution
314 pipeline stall
316 pipeline stall
318 improved warp sharding
400 software-controlled warp sharding
502 execution scheduler
504 waiting shards
506 worklist
508 shared state
510 shard 1 local state
512 shard 2 local state
600 shard switching process
602 block
604 decision block
606 block
608 block
610 block
612 decision block
614 block
616 block
618 block
620 block
622 block
624 block
700 shard scheduler
702 thread status table
704 thread status table entry
706 comparator
708 comparator
710 comparator
712 comparator
714 subtraction logic
716 multiplexer
718 multiplexer
800 state machine
802 INACTIVE state
804 ACTIVE state
806 READY state
808 BLOCKED state
810 STALLED state
1000 parallel processing unit
1002 I/O unit
1004 front-end unit
1006 scheduler unit
1008 work distribution unit
1010 hub
1012 crossbar
1014 NVLink
1016 interconnect
1018 memory
1100 general processing cluster
1102 pipeline manager
1104 pre-raster operations unit
1106 raster engine
1108 work distribution crossbar
1110 memory management unit
1112 data processing cluster
1114 primitive engine
1116 M-pipe controller
1200 memory partition unit
1202 raster operations unit
1204 level two cache
1206 memory interface
1300 streaming multiprocessor
1302 instruction cache
1304 scheduler unit
1306 register file
1308 core
1310 special function unit
1312 load/store unit
1314 interconnect network
1316 shared memory/L1 cache
1318 dispatch
1400 processing system
1402 central processing unit
1404 switch
1406 parallel processing module
1500 exemplary processing system
1502 communications bus
1504 main memory
1506 input devices
1508 display devices
1510 network interface
1600 graphics processing pipeline
1602 output data
1604 data assembly
1606 vertex shading
1608 primitive assembly
1610 geometry shading
1612 viewport SCC
1614 rasterization
1616 fragment shading
1618 raster operations
1620 input data
1702 parallel processing unit
1704 gaming system
1706 vehicle
1708 robot
1800 data center
1802 data center infrastructure layer
1804 framework layer
1806 software layer
1808 application layer
1810 resource orchestrator
1812 grouped computing resources
1814a node C.R.
1814b node C.R.
1814c node C.R.
1816 job scheduler
1818 configuration manager
1820 resource manager
1822 distributed file system
1824 software
1826 application(s)

Various functional operations described herein may be implemented in logic that is referred to using a noun or noun phrase reflecting said operation or function. "Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system comprising:
   a memory to store an application; and
   an execution scheduler configured to:
      generate at least one warp for the application, the at least one warp comprising a plurality of threads; and
      relinquish control from a first thread of the warp to a second thread of the warp on condition that:
   the first thread encounters a long stall hint instruction inserted in the first thread, triggering a run-time test;
   the run-time test detects a long stall;
   the first thread and the second thread are divergent threads; and
   wherein the long stall hint instruction is inserted in the first thread between a long-latency producer instruction and a consumer instruction that utilizes a result of the long-latency producer instruction.

2. The system of claim 1, wherein the long stall is at a consumer location in the first thread for a result of an instruction generating a memory stall.

3. The system of claim 1, wherein the control is relinquished via a YIELD instruction.

4. The system of claim 1, wherein the control is relinquished via a JPC instruction.

5. The system of claim 1, further comprising:
   the at least one warp comprising a different thread for each ray cast by a ray tracing application; and
   the execution scheduler generating a plurality of shards of the at least one warp, each shard consisting of threads of the plurality of threads executing a same shader module.

6. A system comprising:
   at least one graphics processing unit configured to sequentially execute different shards of a warp in a Single Instruction Multiple Thread (SIMT) manner, each shard comprising one or more threads of the warp; and
   logic to:
      detect a long stall hint instruction in a first shard of the different shards; and
      in response to detecting the long stall hint instruction:
   perform a runtime test for a long stall in the first shard;
   on condition that the long stall is detected:
   suspend execution of the first shard;
   select a second shard of the different shards for execution, the second shard selected at least in part for being divergent from the first shard;
   initiate execution of the second shard;
      wherein the long stall hint instruction is detected in the first shard between a long-latency producer instruction and a consumer instruction that utilizes a result of the long-latency producer instruction.

7. The system of claim 6, wherein the long stall hint instruction comprises a pre-execution hint inserted at a consumer location of a result of a long-latency instruction.

8. The system of claim 7, further comprising logic to test whether an instruction generates the long stall upon encountering the long stall hint instruction during execution of the first shard.

9. The system of claim 6, further comprising:
a JPC instruction configured to cause the at least one graphics processing unit to suspend execution of the first shard and initiate execution of the second shard.

10. The system of claim 6, further comprising:
a YIELD instruction configured to cause the at least one graphics processing unit to suspend execution of the first shard and initiate execution of the second shard.

11. The system of claim 10, wherein the YIELD instruction is configured to leave configured execution barriers unaltered.

12. A method comprising:
executing a single instruction multi-thread (SIMT) application as a plurality of threads;
splitting the execution of the plurality of threads into sequentially executed groups of threads in response to execution divergence among the plurality of threads, each of the groups executed in a SIMT manner, wherein each of the groups is a shard;
detecting a long stall in a first one of the shards, the detecting triggered by execution of a compiler-generated hint instruction in the first one of the shards;
in response to detecting the long stall in the first one of the shards, switching execution from the first one of the shards to a second one of the shards; and
wherein the compiler-generated hint instruction is detected in the first one of the shards between a long-latency producer instruction and a consumer instruction that utilizes a result of the long-latency producer instruction.

13. The method of claim 12, wherein the second one of the shards to execute is selected by the first one of the shards.

14. The method of claim 12, wherein the second one of the shards to execute is selected from a worklist by a hardware scheduler.

15. The method of claim 12, wherein splitting the execution of the plurality of threads into the sequentially executed groups of threads further comprises copying shared state values of the plurality of threads to local memory locations for each of the groups of threads.

16. A system comprising:
a memory;
a processing cluster comprising a plurality of hardware units; and
a graphics processing unit to:
execute an application stored in the memory in parallel on the plurality of hardware units, wherein on each of the hardware units the application is executed in a single instruction multi-threaded (SIMT) manner as a plurality of threads;
on each of the hardware units, split the execution of the plurality of threads into sequentially executed groups of threads upon the occurrence of thread divergence, each of the groups being a shard;
detect a long stall in any one of the shards as a result of encountering a long stall hint instruction in the any one of the shards;
in response to detecting the long stall in any one of the shards, switch execution to a different one of the shards on a same hardware unit of the plurality of hardware units;
wherein the long stall hint instruction is encountered between a long-latency producer instruction and a consumer instruction that utilizes a result of the long-latency producer instruction.

17. The system of claim 16, wherein the long stall hint comprises a pre-execution hint inserted at a location of a consumer of a long-latency instruction.

18. The system of claim 17, further comprising logic to test whether a memory read instruction generates the long stall upon encountering the long stall hint instruction.

19. The system of claim 16, further comprising:
a JPC instruction configured to cause the processing cluster to switch the execution.

20. The system of claim 16, further comprising:
a YIELD instruction configured to cause the processing cluster to switch the execution of the shards.

21. A method comprising:
executing a single instruction multi-thread (SIMT) application as a plurality of threads;
splitting the execution of the plurality of threads into sequentially executed groups of threads in response to execution divergence among the plurality of threads, each of the groups executed in a SIMT manner, wherein each of the groups is a shard;
detecting a long stall in a first one of the shards, the detecting triggered by execution of a compiler-generated hint instruction in the first one of the shards;
in response to detecting the long stall in the first one of the shards, switching execution from the first one of the shards to a second one of the shards; and
wherein the compiler-generated hint instruction is executed in the first one of the shards between a long-latency producer instruction and a consumer instruction that utilizes a result of the long-latency producer instruction.

22. The method of claim 21, wherein the second one of the shards to execute is selected by the first one of the shards.

23. The method of claim 21, wherein the second one of the shards to execute is selected from a worklist by a hardware scheduler.

24. The method of claim 21, wherein splitting the execution of the plurality of threads into the sequentially executed groups of threads further comprises copying shared state values of the plurality of threads to local memory locations for each of the groups of threads.

* * * * *